US011883826B2

(12) United States Patent
Labrue

(10) Patent No.: US 11,883,826 B2
(45) Date of Patent: Jan. 30, 2024

(54) UNIT AND METHOD FOR FRAGMENTING A BAGGED SOLID MASS

(71) Applicant: ITEKS, Montazels (FR)

(72) Inventor: Stéphane Labrue, Montazel (FR)

(73) Assignee: ITEKS, Montazels (FR)

( * ) Notice: Subject to any disclaimer, the term of this patent is extended or adjusted under 35 U.S.C. 154(b) by 673 days.

(21) Appl. No.: 17/044,611

(22) PCT Filed: Apr. 1, 2019

(86) PCT No.: PCT/IB2019/052672
§ 371 (c)(1),
(2) Date: Oct. 1, 2020

(87) PCT Pub. No.: WO2019/193485
PCT Pub. Date: Oct. 10, 2019

(65) Prior Publication Data

US 2021/0107010 A1 Apr. 15, 2021

(30) Foreign Application Priority Data

Apr. 3, 2018 (FR) ..................................... 18/00290

(51) Int. Cl.
*B30B 15/06* (2006.01)
*B30B 15/14* (2006.01)
(Continued)

(52) U.S. Cl.
CPC .............. *B02C 1/005* (2013.01); *B01F 31/55* (2022.01); *B30B 15/062* (2013.01); *B30B 15/14* (2013.01); *B65B 69/0091* (2013.01)

(58) Field of Classification Search
CPC ....... B30B 7/04; B30B 9/3082; B30B 15/062; B30B 15/14; B65B 69/0091;
(Continued)

(56) References Cited

U.S. PATENT DOCUMENTS 5,944,470 A 8/1999 Bonerb
7,267,144 B2 * 9/2007 Nyhof ...................... B65B 1/04 141/114
(Continued)

FOREIGN PATENT DOCUMENTS

CN 206766495 12/2017

OTHER PUBLICATIONS

International Search Report for PCT/IB2019/052672 dated May 9, 2019, 3 pages.
(Continued)

*Primary Examiner* — Jimmy T Nguyen
(74) *Attorney, Agent, or Firm* — NIXON & VANDERHYE

(57) ABSTRACT

Disclosed is a fragmentation unit including: —a frame in which there extends a region for receiving a bag, the contents of which is to be fragmented, the region being delimited by the ground and by four virtual planar vertical faces, and divided into a front area and a rear area of equal dimensions by a vertical plane, —at least two pressure plates that are able to move towards each other and vertically, each having a front edge and a vertical planar pressing face, having a rear edge, the rear edge being situated behind a plane containing the virtual planar rear face, and the front edge being tangential to a vertical plane parallel to the plane and dividing the front area of the region into two sub-areas. Also disclosed is a fragmentation method.

19 Claims, 15 Drawing Sheets

Figure 1:
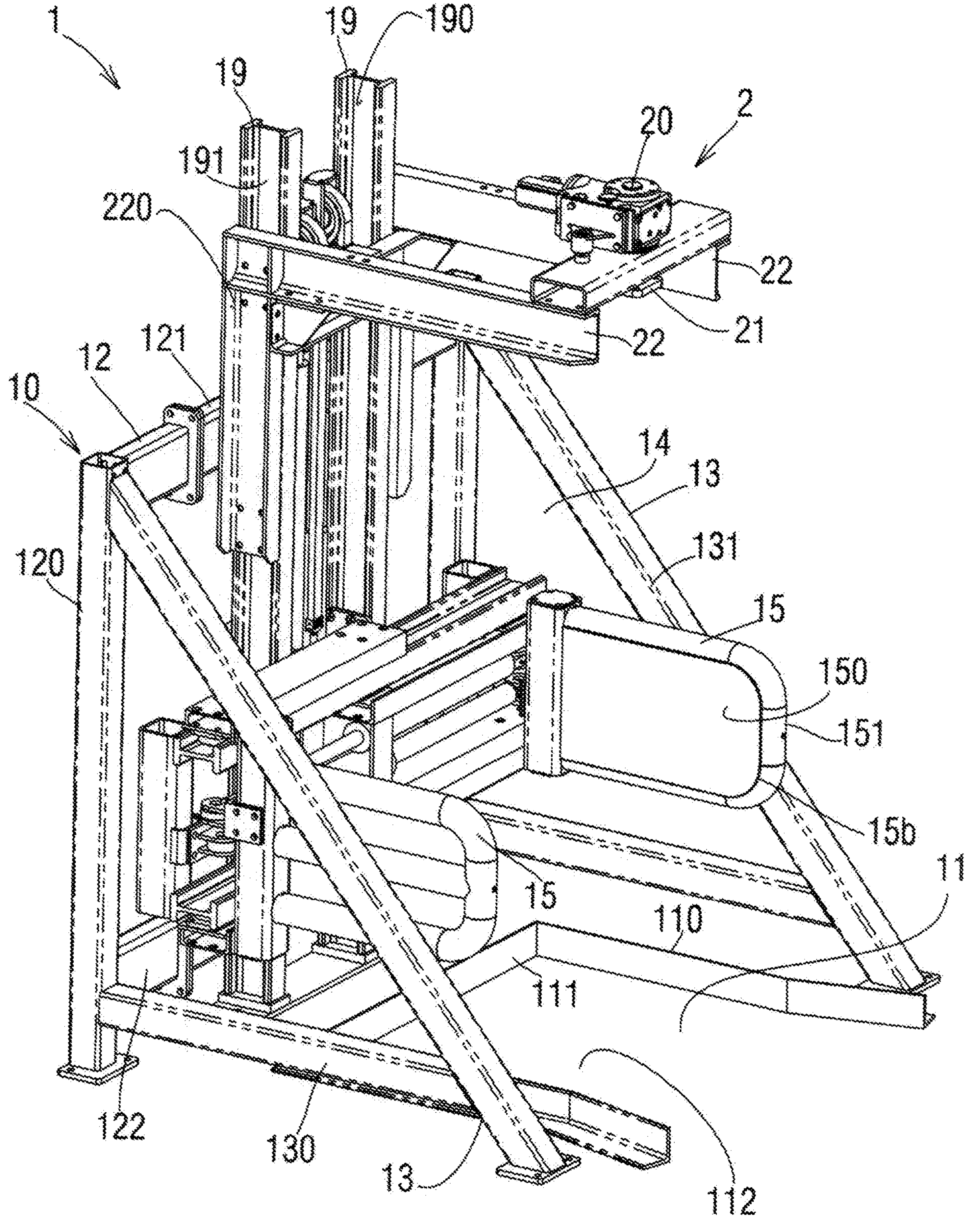

(51) Int. Cl.

| | |
|---|---|
| ***B01F 11/00*** | (2006.01) |
| ***B65B 69/00*** | (2006.01) |
| ***B02C 1/00*** | (2006.01) |
| ***B01F 31/55*** | (2022.01) |

(58) Field of Classification Search
CPC ... B65B 69/0075; B65B 69/0083; B65B 1/24; B65G 65/00; B65G 2201/0238; B66C 19/00; B66C 1/226; B65D 88/66; B01F 11/0065; B01F 31/55; B02C 1/005
See application file for complete search history.

(56) References Cited

U.S. PATENT DOCUMENTS

| | | | |
|---|---|---|---|
| 8,181,568 | B1 | 5/2012 | Hofman et al. |
| 8,567,312 | B2 | 10/2013 | Hofman et al. |
| 9,387,950 | B2 * | 7/2016 | Hofman .............. B65B 69/0075 |
| 2005/0199650 | A1 | 9/2005 | Nyhof et al. |
| 2013/0058744 | A1 | 3/2013 | Mothersbaugh et al. |
| 2015/0360431 | A1 | 12/2015 | Halvorsen et al. |

OTHER PUBLICATIONS

Written Opinion of the ISA for PCT/IB2019/052672 dated May 9, 2019, 14 pages.

* cited by examiner

UNIT AND METHOD FOR FRAGMENTING A BAGGED SOLID MASS

This application is the U.S. national phase of International Application No. PCT/IB2019/052672 filed Apr. 1, 2019 which designated the U.S. and claims priority to French Patent Application No. 18/00290 filed Apr. 3, 2018, the entire contents of each of which are hereby incorporated by reference.

TECHNICAL FIELD

The present invention relates to a unit for fragmenting a solid mass formed from a powdered or compacted particulate material packaged in a flexible bulk transportation container (bulk bag). The present invention also relates to a method for fragmenting a compact, bagged mass.

PRIOR ART

Certain powdered or particulate materials intended to be supplied to production units are known to be packaged in flexible bulk bags. In general, the capacity of these bags is in the range 1 $m^3$ to 2 $m^3$. Usually, the capacity of these bags is of the order of 1.5 $m^3$.

It is known that flexible bags of this type in particular have four flexible walls, which are vertical, rising over a base provided with a flexible cuff for evacuating powdered or particulate materials. It is also known that, under the effect of mechanical vibrations, the powdered material contained in the bag is caused to settle, transforming it into a compact mass. A settling phenomenon of this type is also often the result of packaging the materials when warm, followed by a large drop in temperature. Finally, concerning hygroscopic materials, the effect of settling or compacting is accentuated by the action of the humidity of the air. These various effects render it impossible to empty the bag via the flexible evacuation cuff.

In order to overcome this disadvantage, the prior art has proposed a variety of solutions aimed at fractionating the compact mass in order to reduce it to fragments with sufficiently reduced dimensions to be able to be evacuated via the flexible evacuation cuff included in the bag. Typically, the various solutions proposed proceed via mechanical pressing actions on the material through the flexible walls of the bag. To this end, two opposed pressure elements are essentially used that are capable of exerting a local pressure on two opposed external faces of the flexible bag. Under the effect of these opposed pressures and of the penetrating movement of the pressure elements, cracks appear locally in the compacted mass. Repeating this action on the bag, carried out at various heights and positions, leads to fragmenting the mass forming the powdered material. Hence, this mass reaches a degree of division or fragmentation that is sufficient to be able to flow freely out of the bag under gravity by passing through the evacuation cuff.

Normally, the pressure exerted on the bag as well as the value for the penetration of the pressure elements into the compact mass are controlled so that the bag is not damaged and as a result of this damage does not produce debris of the type such as to pollute the powdered materials. Fragmentation units employing the techniques mentioned above have been described in particular in the documents U.S. Pat. Nos. 5,944,470, 8,181,568, 8,567,312 and US2015/0360431.

U.S. Pat. No. 5,944,470 discloses a fragmentation unit formed by a supporting structure on which, at a distance from the ground, a horizontal platform is articulated in order to receive a transport pallet for a powdered material packaging bag. Pivoting of the platform allows the contents of the bag to be discharged into a transporter installed on the ground. The platform carries two fragmentation systems, which are opposed, each provided with a pressure element, which is elongate, actuated by a linear displacement mechanism. The position of the two elongate pressure elements can be adjusted in order to act on the corresponding walls of the bag at different places. That document also discloses fragmentation systems with swinging pallets which can be driven and swung upwards during the action on the bag.

Fragmentation systems with swinging pallets of this type are also disclosed in the U.S. Pat. Nos. 8,181,568 and 8,567,312, which respectively disclose a fragmentation unit provided with a frame defining a type of cage within the volume of which a lifting mechanism carrying a turntable provided to receive the bag to be fragmented is mounted. Pivoting pressure elements are secured to the frame. By pivoting the table and lifting or lowering it, different areas of the bag are presented to the action of the pressure elements. The pivoting movement of the pressure elements is carried out from bottom to top so that the pressing force exerted on the bag is directed upwardly.

This therefore avoids the effects of settling of material in the lower area of the bag which has a tendency to tear the walls of that bag.

One of the disadvantages of the fragmentation units mentioned above lies in the cylindrical shape of the pressure elements. In fact, this shape has a tendency to generate a punching effect, risking damage to the bag if the pressing force is too high. In addition, because these pressure elements have relatively small pressing surfaces, the mass contained in the bag is quite frequently not entirely returned to its original state and so the contents of the bag still includes many clumps of various sizes, which on the one hand escape the action of pressing and on the other hand are pushed up towards the top of the bag.

Another disadvantage of the aforementioned fragmentation units lies in the fact that the bag has to be lifted above the ground in order to fragment the mass contained in it. This way of operating poses a number of problems, in particular problems with safety and handing a mass at height. In order to secure those fragmentation units, the bag to be treated has to be confined in a closed space so that if it is inadvertently pushed beyond the lifting table, it cannot fall to the ground and injure personnel in the proximity. For this reason, this unit must be equipped with removable safety barriers which can prevent the bag from falling. Those dispositions increase the manufacturing and retail costs of the fragmentation unit.

Handling a mass above the ground is carried out with the aid of lifting carriages, driving of which is subject to regulation. Thus, the driver or forklift operator has to have been specifically trained and must have a certificate of driving proficiency, which is periodically renewable, in order to operate it. It will be understood that these various requirements significantly increase the cost of operating the fragmentation unit.

Disadvantages of this type do not arise in application US 2015/0360431, which discloses a fragmentation unit comprising a frame defining a region for receiving a bag to be conditioned, the bag being installed on a transport pallet that is itself disposed on the ground. The frame comprises two lateral walls to which two opposed fragmentation systems are attached, comprising pressure plates for fragmentation, which are rectangular, vertical, carried by actuators in the form of cylinders and driven in translation towards the bag by the cylinders. In addition, these fragmentation systems are periodically vertically displaced in order to press the bag over its entire height.

The disadvantage of a fragmentation unit of that type lies in the length of the plates, which cover the entire width of the bag (the term "length" should be understood to mean the largest horizontal dimension thereof). A disposition of this type will have a tendency to limit the pressing efficiency by slowing the displacement in the bag of the material that is returned to its original form. However, a displacement of this type, in allowing this material to escape from the grip of the pressure plates, means that it is necessary to obtain optimal fragmenting the whole of the mass contained in the bag. Furthermore, the actuators for the pressure plates form lateral projections, which are opposed, projecting out from the lateral flanks of the fragmentation unit. A disposition of this type significantly increases the lateral bulk of the fragmentation unit and requires a suitable cowling in order to cover the actuators.

Patent application US 2005/199650 discloses a bag emptying unit equipped with means which, by the action of pressing the bag, can oppose the formation of vaults above the emptying cuff. Those pressing means occupy a lower position and are not height-displaceable, and so they cannot be used to condition the entire contents of a bag.

DISCLOSURE OF THE INVENTION

The aim of the present invention is to overcome the aforementioned disadvantages.

Thus, the present invention pertains to a fragmentation unit in which the bag, the bulk contents of which are to be fragmented, rests on a support placed on the ground during the fragmentation operations.

The present invention also pertains to a fragmentation unit with a reduced bulk which, however, is capable of receiving large capacity bags.

Finally, the present invention pertains to a fragmentation unit designed to facilitate displacement of the fragmented material in the bag during the fragmentation operation.

To this end, the fragmentation unit in accordance with the invention comprises:

a frame including a vertical rear flank and two lateral flanks that are parallel and perpendicular to the rear flank, said flanks defining an internal volume in which a region extends for receiving a bag with a parallelepipedal shape the contents of which are to be fragmented, said bag being provided in order to rest on an openwork support installed in said receiving region, the region being accessible via an opening formed in the front portion of the frame, said region, which is parallelepipedal in shape, being open towards the top, being separated from the rear and lateral flanks of the frame, and being delimited by the ground and by four virtual planar vertical faces, namely a virtual front face, a virtual rear face, both being parallel to the rear flank of the frame and two virtual lateral faces, said region being divided into a front area and into a rear area of equal dimensions by a vertical geometric plane (AA') parallel to the rear flank of the frame, a pressing assembly comprising at least two vertical pressure plates, which are opposed, parallel to the lateral flanks of the frame and mounted in the internal volume that defines the frame, each plate having a height, a length defined in accordance with a direction perpendicular to the rear flank and extending between a rear edge (154) of the plate and a front edge of said plate opposite to said rear edge, said front edge facing the front opening, each pressure plate having a vertical planar pressing face (150) having a rear edge opposite to the front edge of the pressure plate and said pressure plates being movably mounted so as to move towards or away from each other and in a manner which is movable in respect of height, and said fragmentation unit being essentially characterized in that the rear edge of the pressing face of each pressure plate is situated behind a geometric plane (DD') containing said virtual planar rear face, and in that the front edge of each pressure plate is tangential to a vertical geometric plane (BB') parallel to the plane (AA') and dividing said front area of the region into two sub-areas, namely a rear sub-area comprised between the planes (AA') and (BB') and a front sub-area comprised between the plane (BB') and the virtual front face (11*a*) of said region.

In accordance with another characteristic of the invention, the depth of the rear sub-area is less than the depth of the front sub-area.

In accordance with another characteristic of the invention, the plane (BB') is at a distance of at most fifteen centimeters from the plane (AA').

In accordance with another aspect of the invention, the fragmentation unit is essentially characterized in that the plane (BB') is located to the rear of the front face of the bag when the bag is present in the receiving region.

In accordance with another aspect of the invention, the fragmentation unit is essentially characterized in that each pressure plate of the pressing assembly occupies only a portion of the width of the bag when said bag is present in the receiving region and in that each pressure plate in total covers the normal distance between the planes BB' and DD'.

In accordance with another characteristic of the invention, each pressure plate covers only 50% to 65% of the width of the bag.

Because of these various dispositions, the portion of the material that has already returned to its original state because of pressing, for example to a powdered state, under the effect of the action of forces exerted on the material by the pressure plates, is expelled out of their way by displacement towards the front of the bag and towards the top. Because of this expulsion movement, blocks that have not yet been fragmented can get into the space freed by the material that has been expelled and can then be subjected to the action of the plates during a fresh pressing action. Similarly, because of this expulsion movement, blocks that have not been fragmented located in the field of the mechanical pressing actions are no longer protected by the expelled material, and for this reason are directly exposed to the dislocation action exerted by the pressure plates. Thus, it will be understood that such a disposition greatly improves the efficiency of the fragmentation unit.

In accordance with another characteristic of the invention, each pressure plate is rigidly fixed to a dedicated support carriage that is movably mounted in translation on horizontal rails, fixed to a common lifting carriage that is movably mounted in translation on two vertical rails fixed to the rear flank of the frame, said support carriages being actuatable in translation along their rails, moving towards or away from each other, by means of motor means.

The term "front chamber" of a cylinder as used below means that of the two chambers thereof containing the rod and the term "rear chamber" means the opposite chamber. The term "working chamber" should be understood to mean that of the two chambers which is supplied with fluid under pressure in order to displace in the direction of pressing the bag, the piston-rod assembly and the associated pressure plate.

In accordance with another characteristic of the invention, each motor means for actuating the carriages by moving towards or away from each other is formed by a hydraulic cylinder and the two hydraulic cylinders are hydraulically mounted in series, the rear chamber of the first cylinder being hydraulically connected by means of a line to the front chamber of the second cylinder, the value for the section of the rear chamber of the first cylinder being equal to the value for the section of the front chamber of the second cylinder reduced by the value for the section of the rod of said second cylinder. In this manner, the movements of the pressure plates towards or away from each other are carried out at the same speed and are perfectly synchronized.

In accordance with another characteristic f the invention, the fragmentation unit is equipped with a means for measuring the displacement of the pressure plates along their rails, and with a detector of the hydraulic pressure threshold associated with the supply circuit for the working chamber of one of the two cylinders, said measuring means and said detector being connected to a monitoring and control unit and said detector being capable of delivering a threshold transgression signal when the pre-established value for the threshold is transgressed, the monitoring and control unit, starting from receipt of said signal, ensuring the generation of a point of origin for the displacements of the pressure plates during an initialization phase in which the pressure plates are pressed against the bag, these pressure plates being displaced towards each other during each bag pressing operation from the point of origin by a constant, pre-established value.

In accordance with another characteristic of the invention, the height of the pressure plates with respect to the ground can be adjusted. In this manner, the action of the pressure plates is stepped and can be applied over the entire height of the bag.

In accordance with another characteristic of the invention, the lifting carriage, which is fixed to rails for guiding the support carriages of the pressure plates, is actuated in translation along its rails by a motor assembly formed by a vertical cylinder and a motion linkage deployed between the rod of the cylinder and the lifting carriage, said linkage being configured in the manner of a lifting pulley in order to multiply the amplitude of the movement of the rod of the cylinder, the cylinder being oriented in a manner such that its rod occupies an upper position and the motion linkage being formed on the one hand by a roller mounted in rotation in a clevis fixed to the upper end of the rod of the cylinder, and on the other hand by a lift chain wound partly around the roller and fixed by one of its two ends to the lifting carriage and by its other end to the rear flank.

Additionally, in accordance with another characteristic of the invention, the hydraulic circuit supplying the cylinder comprises hydraulic overload means.

In accordance with another characteristic of the invention, the fragmentation unit is provided with a lifting assembly provided to raise the bag and release it from the openwork support on which it rests, said lifting assembly comprising a head provided with a rotary spindle to which the transport straps of the bag are attached lanyards, said spindle being actuatable in rotation by a motor means, in order to cause the bag to pivot by a quarter of a turn.

In accordance with another characteristic of the invention, the lifting assembly is formed on the one hand by a bracket mounted in a manner which is movable in translation on guide tracks that comprise vertical guide rails and on the other hand by a motor assembly fixed to the rear flank of the frame and acting on the bracket in order to displace the height thereof, said motor assembly being formed by a hydraulic cylinder and a motion linkage deployed between the bracket and the rear flank of the frame, said hydraulic cylinder being oriented in a manner such that its rod occupies an upper position and said motion linkage being configured in the manner of a lifting pulley in order to multiply the amplitude of movement of the rod of the cylinder and being formed by a roller mounted in rotation in a clevis carried by the rod of the cylinder and by a lift chain wound partly around the roller and fixed by one of its two ends to the bracket and by its other end to the rear flank of the frame. By raising the bag and rotating the spindle of the support head by a fraction of a turn, for example by a quarter of a turn, two other opposed faces of the bag are brought to face the pressure plates.

The present invention also concerns a method for fragmenting a bagged mass using a fragmentation unit in accordance with the invention.

This fragmentation method is essentially characterized in that it consists of:

I) placing the pressure plates at the mid-height of the bag and bringing them towards each other until they make contact with the bag and establish a point of origin for the displacements of the pressure plates towards each other, II) bringing the pressure plates to the upper part of the bag with a view to starting a fragmentation cycle, III) starting a fragmentation cycle by pressing the bag, IV) after the cycle of fragmentation by pressing, lowering the pressure plates towards the bottom by a predefined displacement step, V) repeating steps III and IV until the lower area of the bag is reached.

In accordance with another characteristic of the method of the invention, each fragmentation cycle consists of:

a) applying the pressure plates against the bag and displacing them one towards the other by a predetermined distance, measured from the point of origin, in order to fragment the mass it contains, b) releasing the pressure, c) moving the pressure plates away from each other, d) raising the bag, e) pivoting the bag by a quarter of a turn, f) replacing it on its openwork support, g) repeating steps a) to f) for each of the lateral faces of the bag.

The fact that the bag is lifted and replaced after each fragmentation cycle contributes to agitating the material by dislodging clusters of material in the form of columns or banks which could be formed in the bag. The steps a) to f) will be carried out at least n times, n being equal to the number of faces of the bag.

In accordance with another characteristic of the invention, immediately before each fragmentation cycle, the method consists of bringing the pressure plates to the upper part of the bag and of repeating the preceding fragmentation cycles. Thus, for the second fragmentation cycle, the plates will be brought to the upper part of the bag and after pressing the four faces, lowered by the predetermined displacement step in order to reach the second level in height. For each of the following cycles, the fragmentation plates will always be brought to the upper position of the bag and after pressing the four faces, lowered so that they are disposed in accordance with the immediately lower level in height, the pressing operations for the four faces and lowering of the plates being repeated until the corresponding height level is reached.

In accordance with another characteristic, the fragmentation method consists of slowing the movement of the bag during its rotation.

Preferably, in accordance with a complementary characteristic, the slowing of the rotational movement of the bag is operated by friction of the bag on the openwork support.

Alternatively, the slowing of the rotational movement of the bag is operated by means of friction of said bag against the pressure plates.

In accordance with another characteristic, before raising the bag, the method consists of angularly displacing the spindle of the head by a quarter of a turn. Thus, when the bag is raised, a slow angular displacement of the bag is obtained that could be further slowed by friction against the openwork support and/or against the pressure plates.

In accordance with another characteristic of the method of the invention, the value for the displacement step of the pressure plates towards the bottom is less than the height of each plate. Thus, from one cycle to the next, an overlapping effect is obtained.

BRIEF DESCRIPTION OF THE FIGURES AND DRAWINGS

Figure 2:
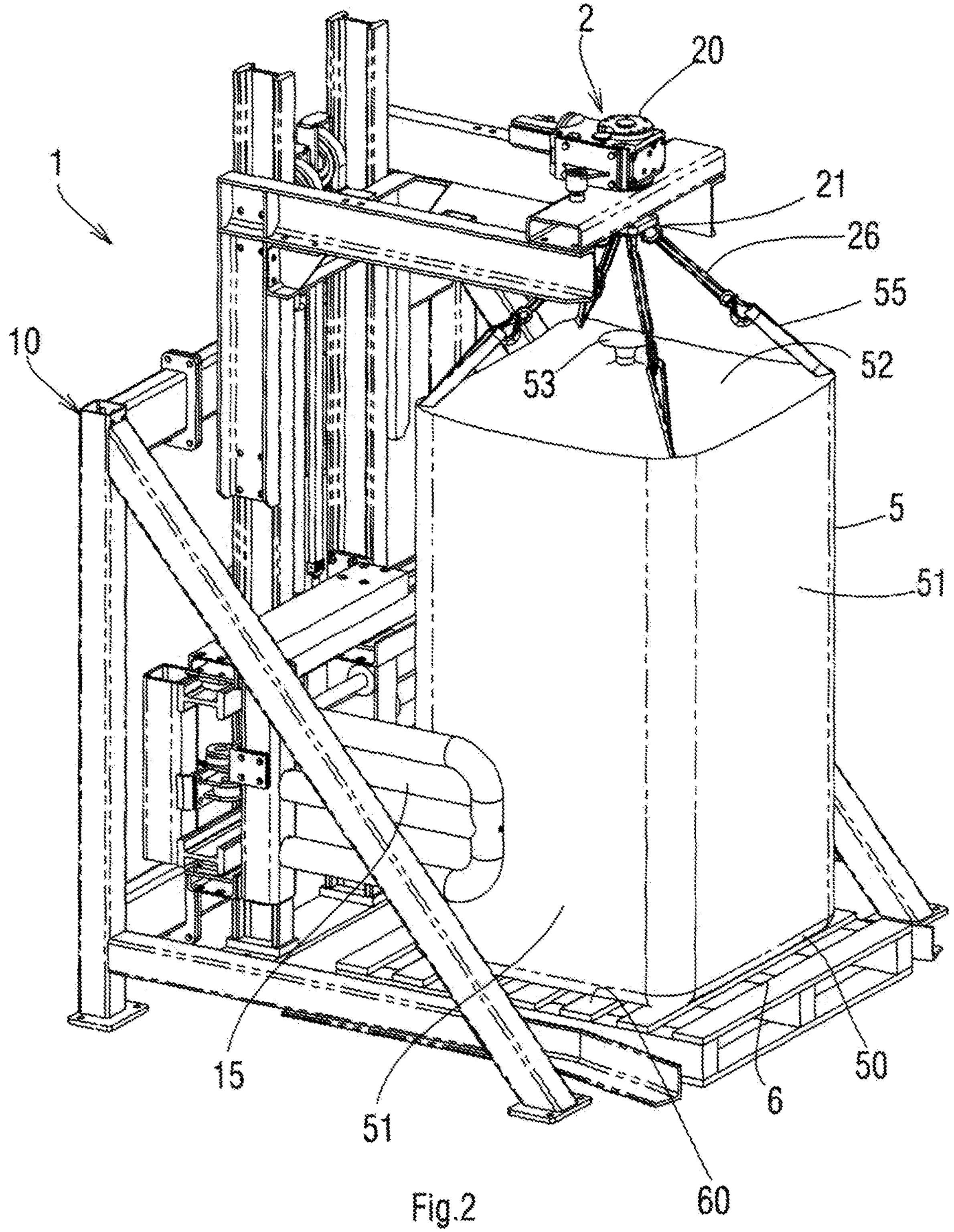
Figure 3:
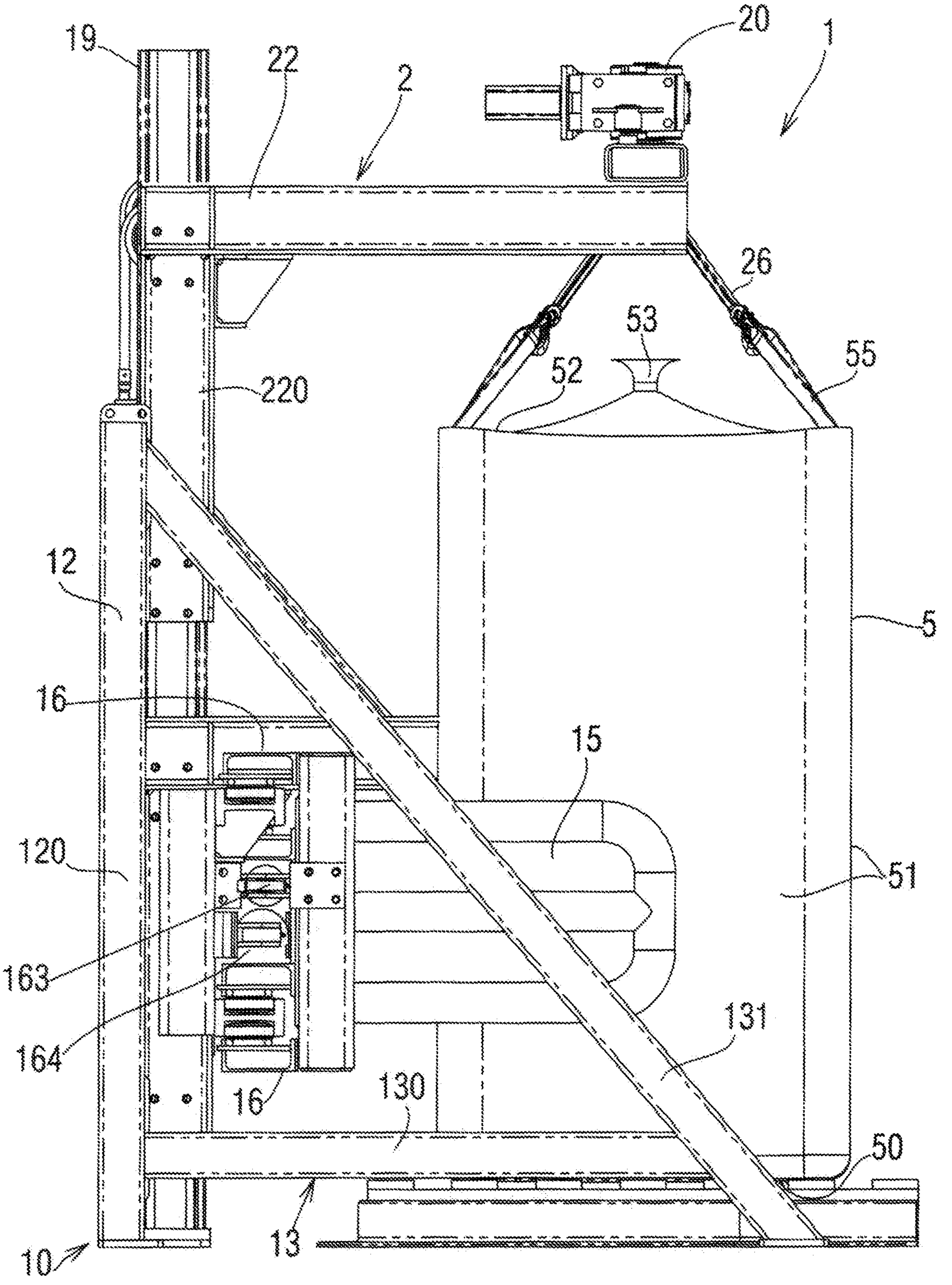
Figure 4:
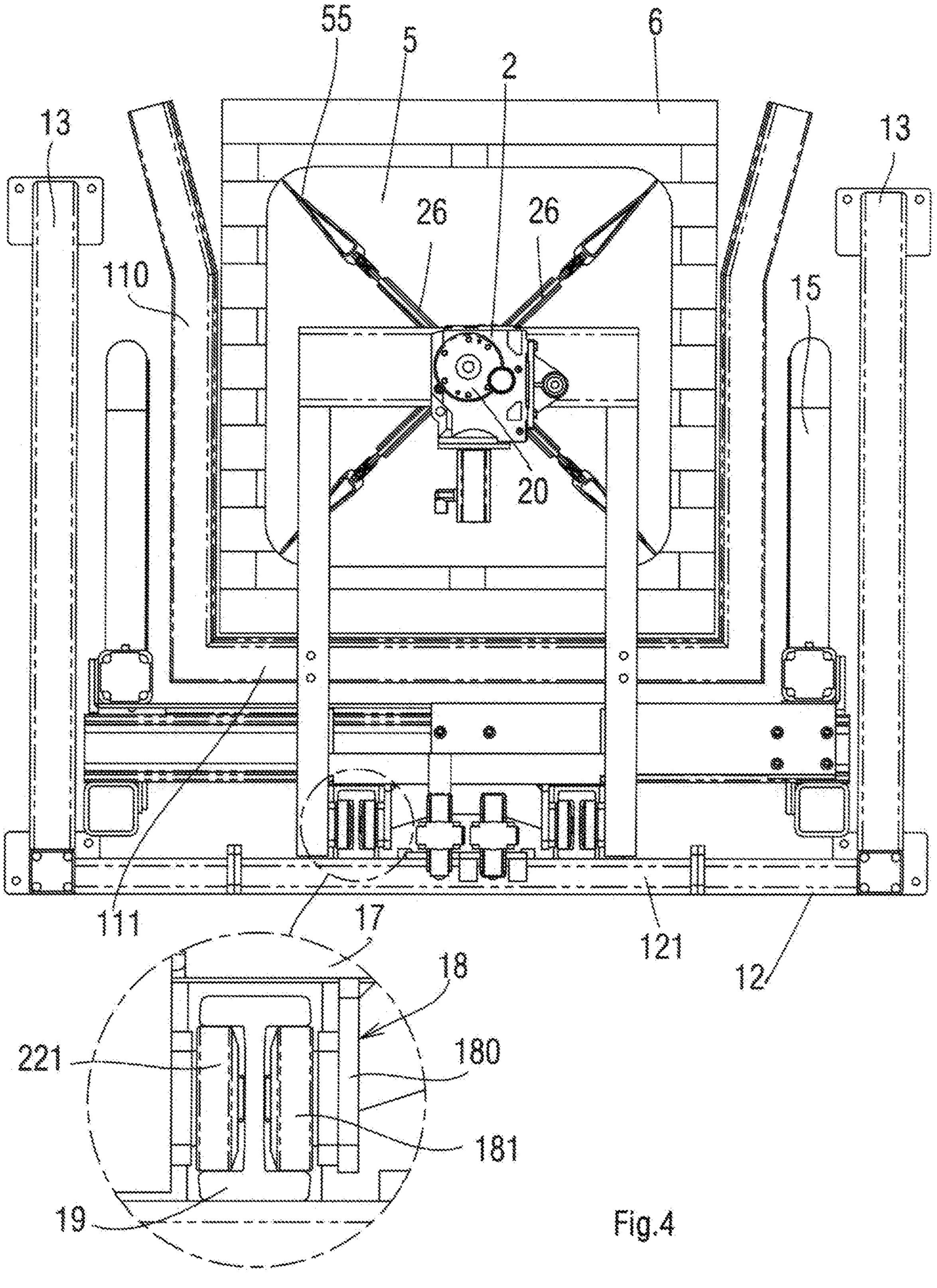
Figure 5:
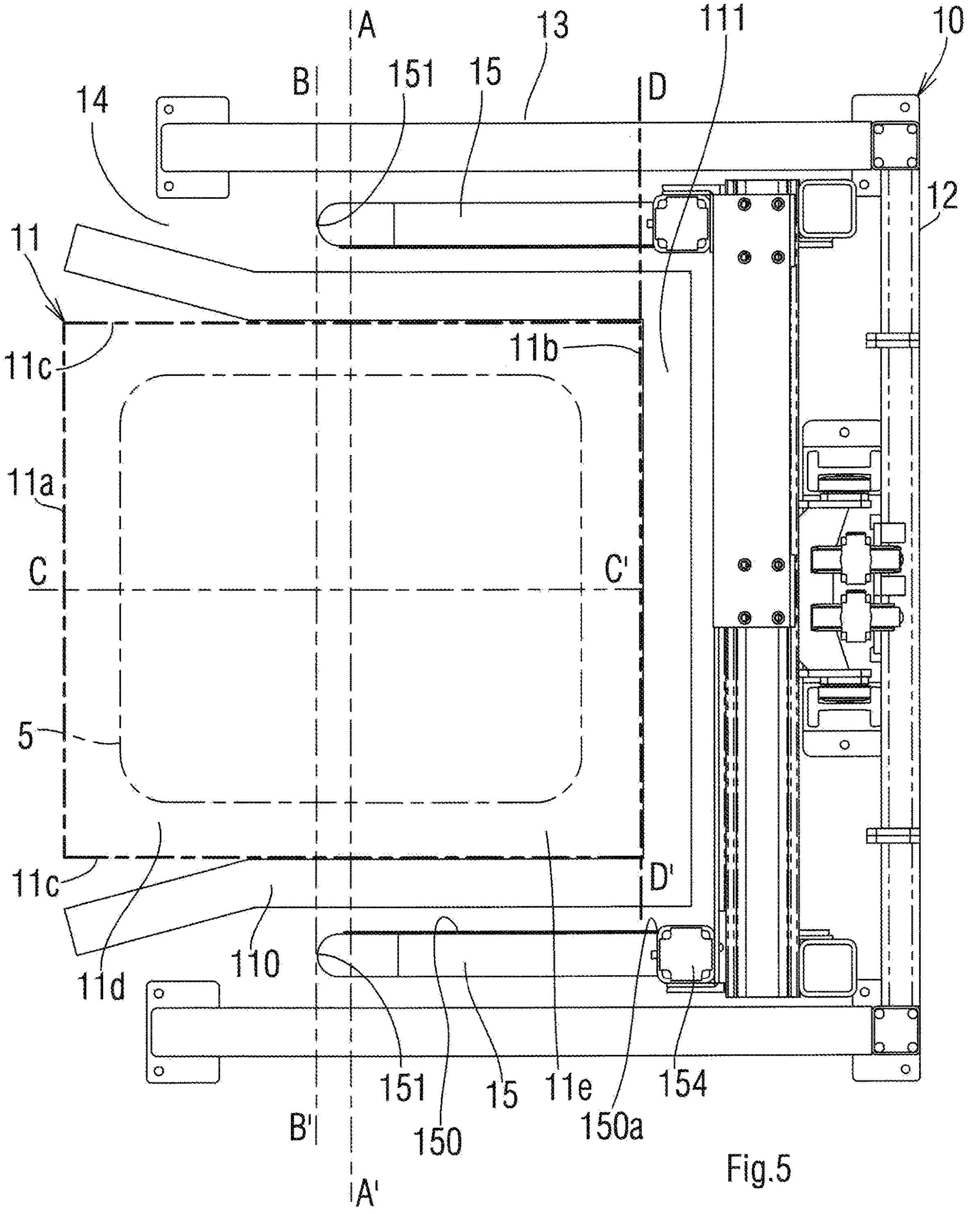
Figure 6:
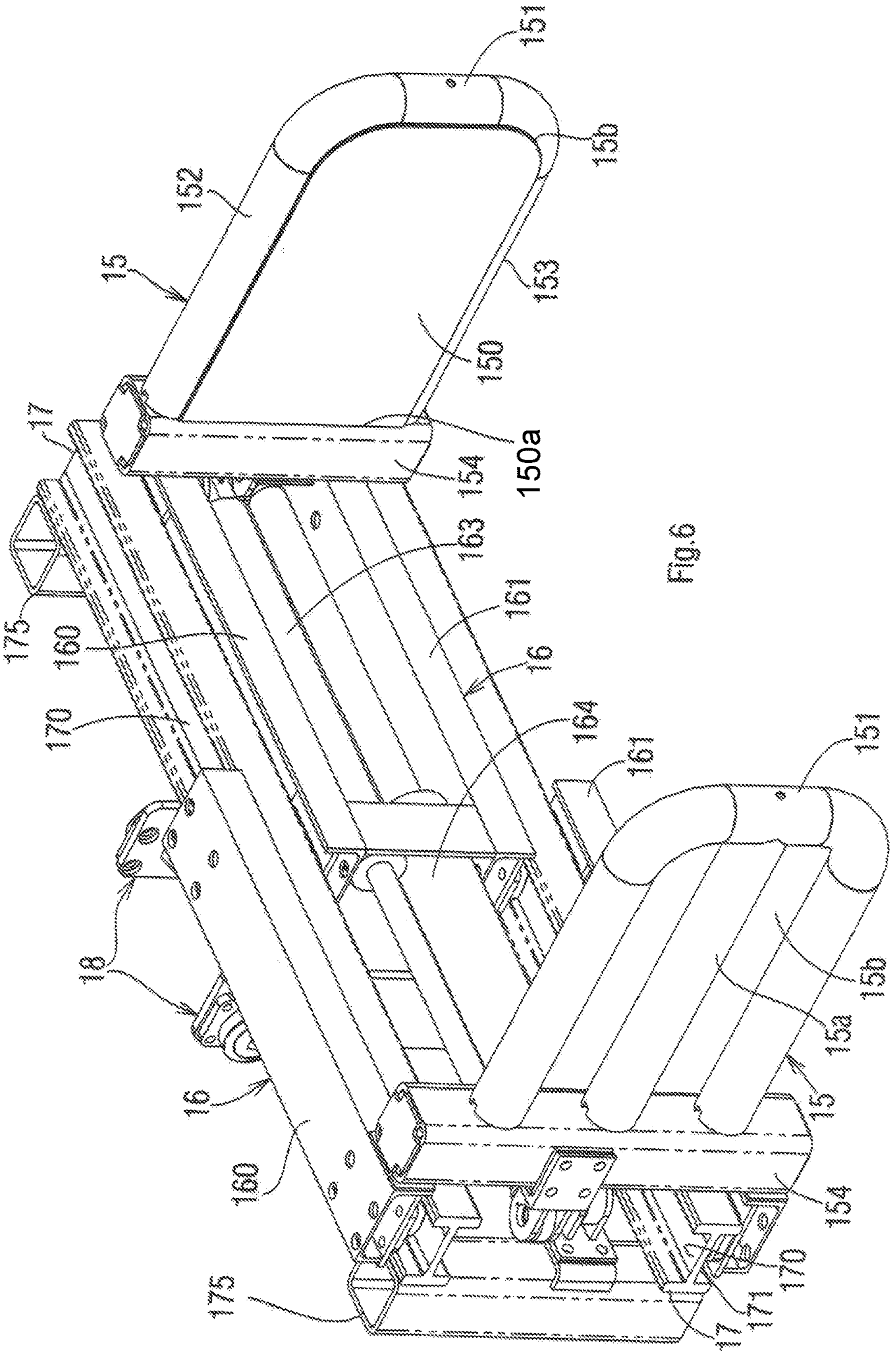
Figure 7:
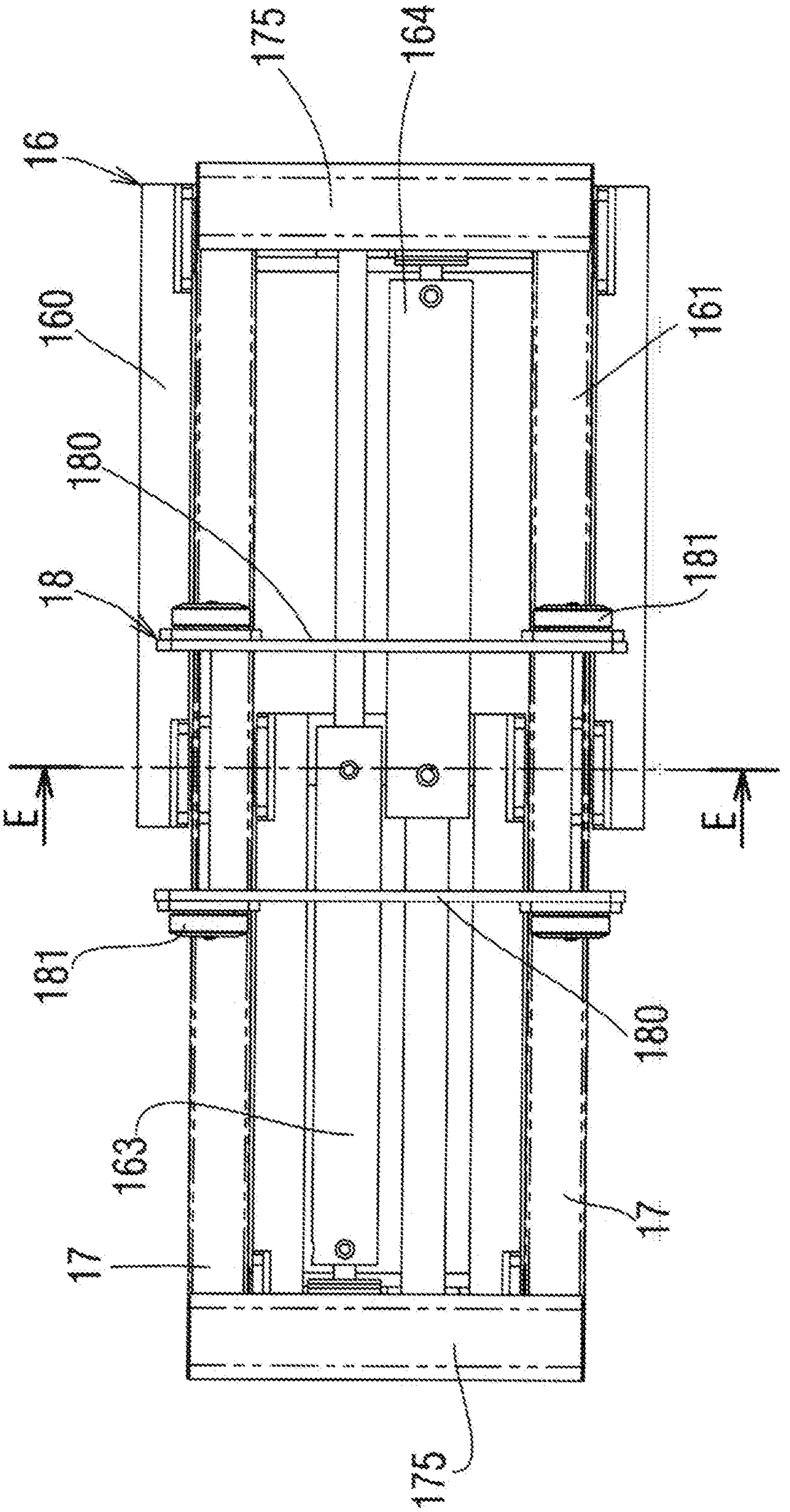
Figure 8:
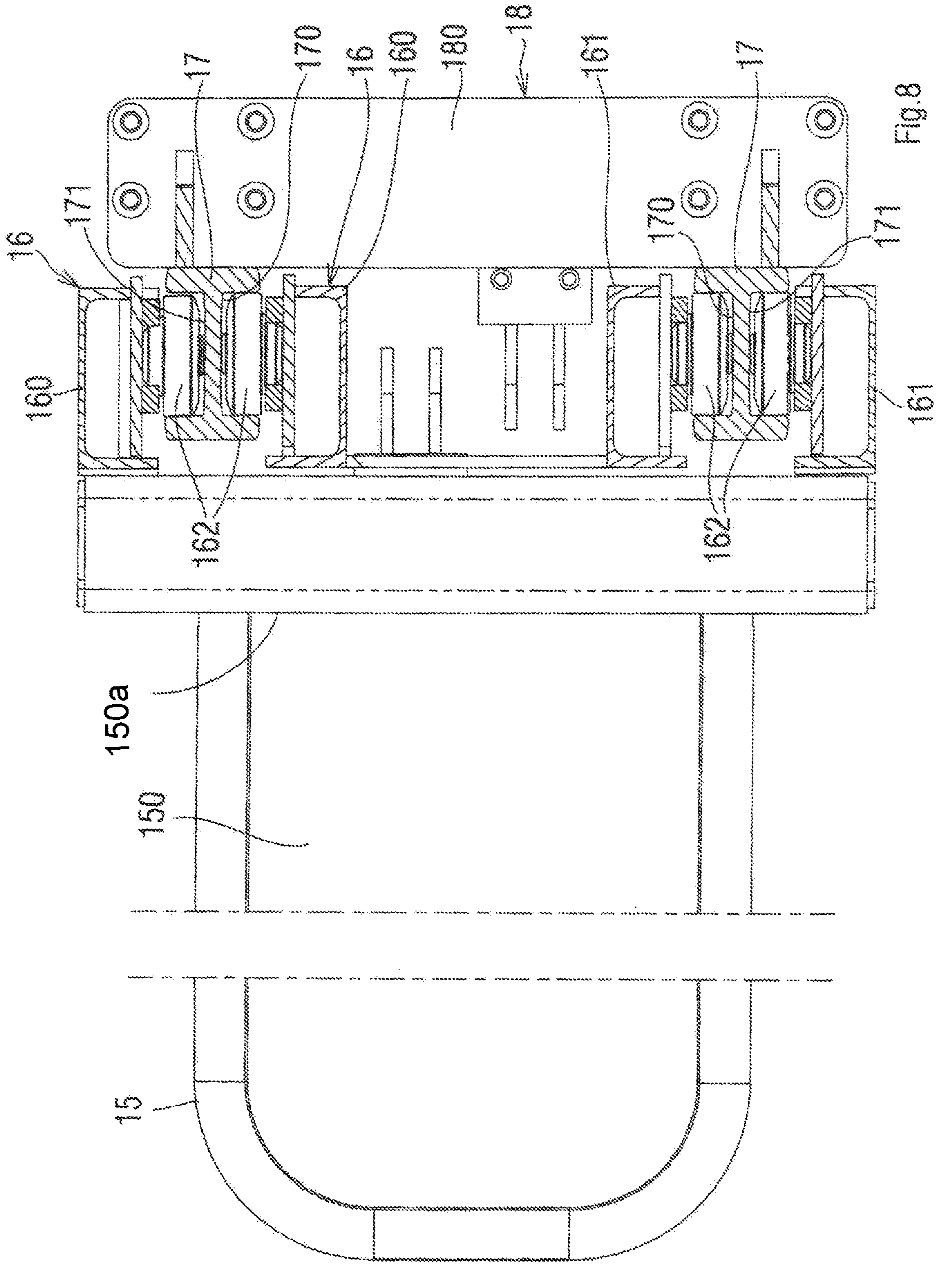
Figure 9:
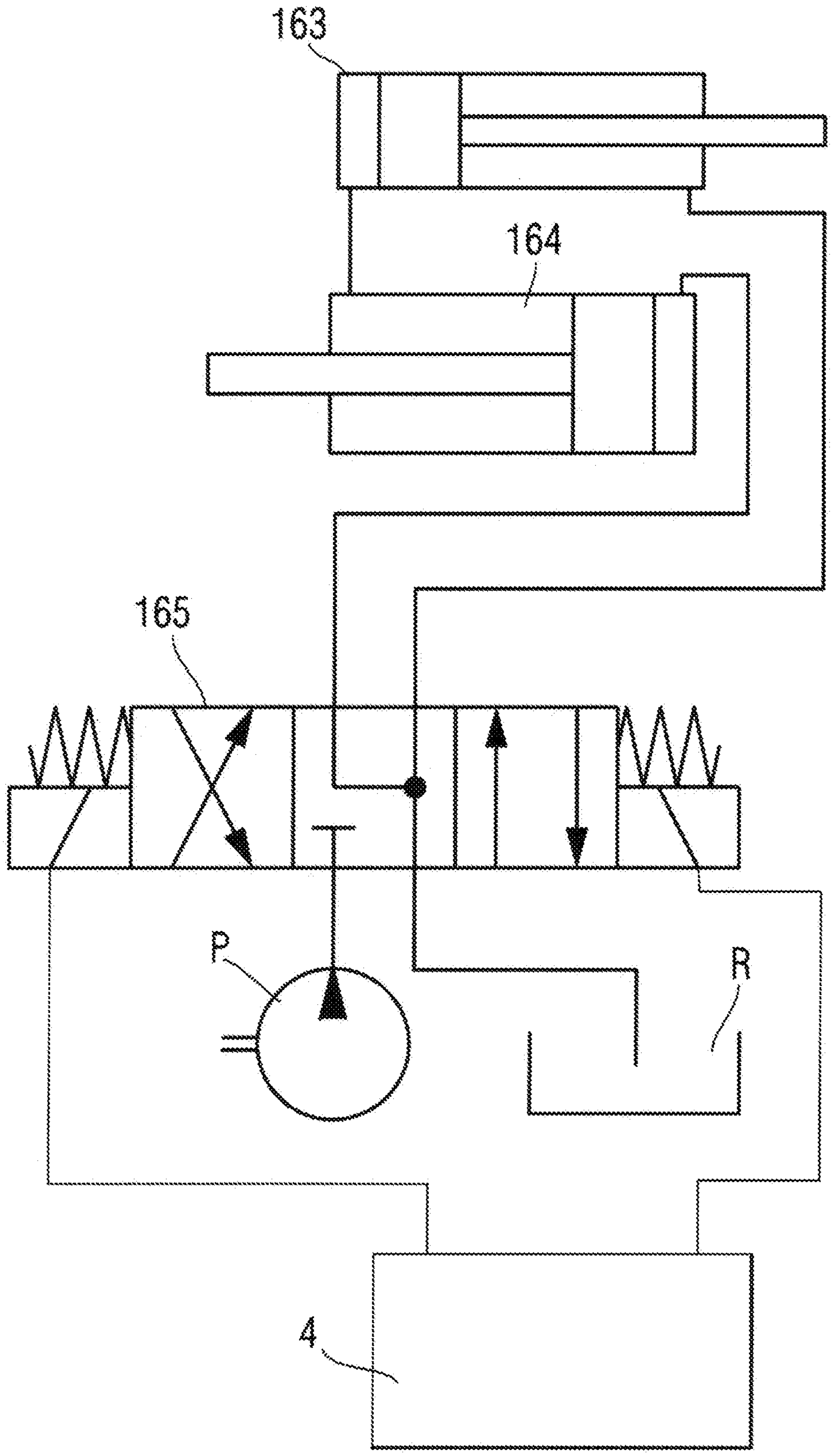
Figure 10:
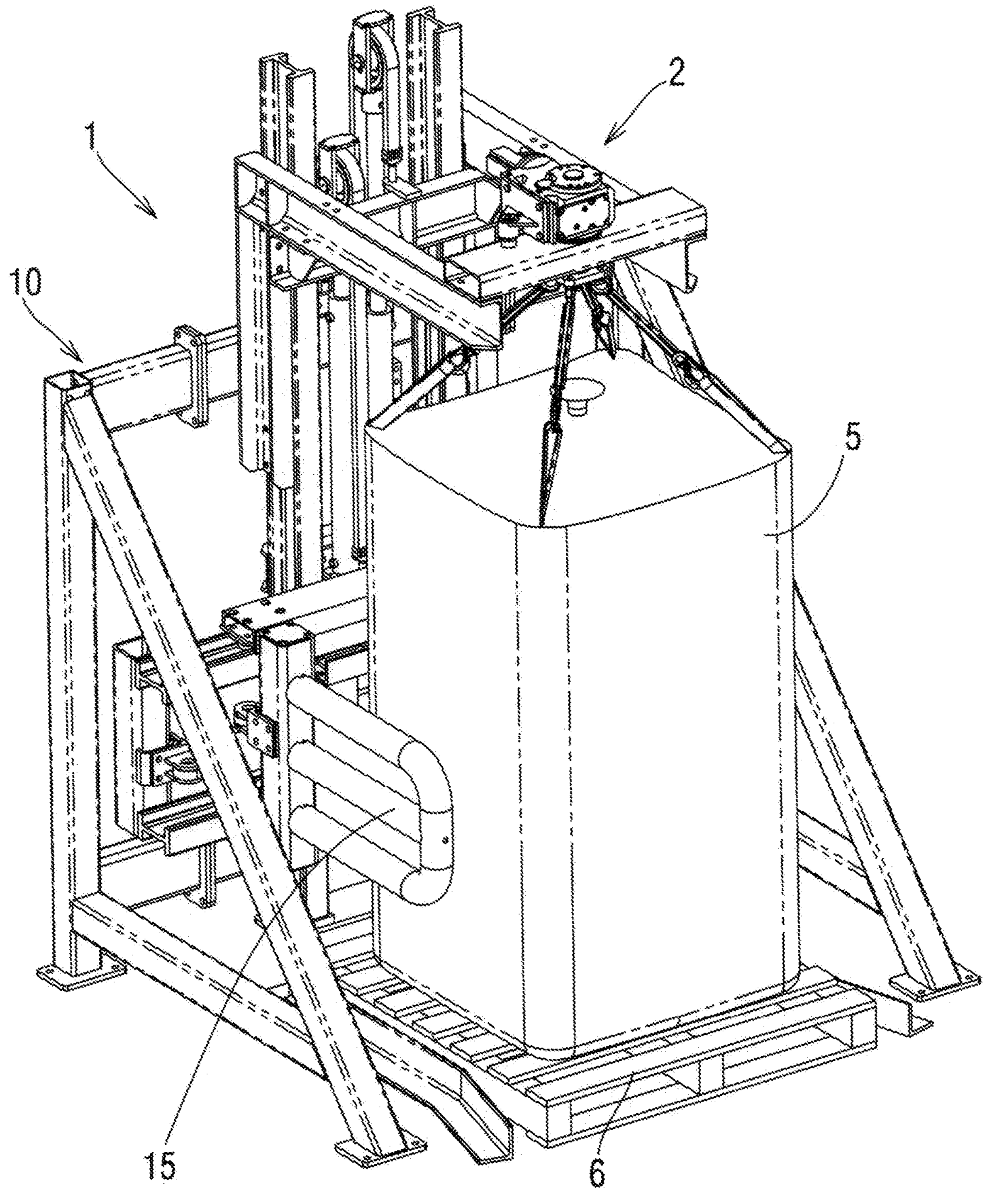
Figure 11:
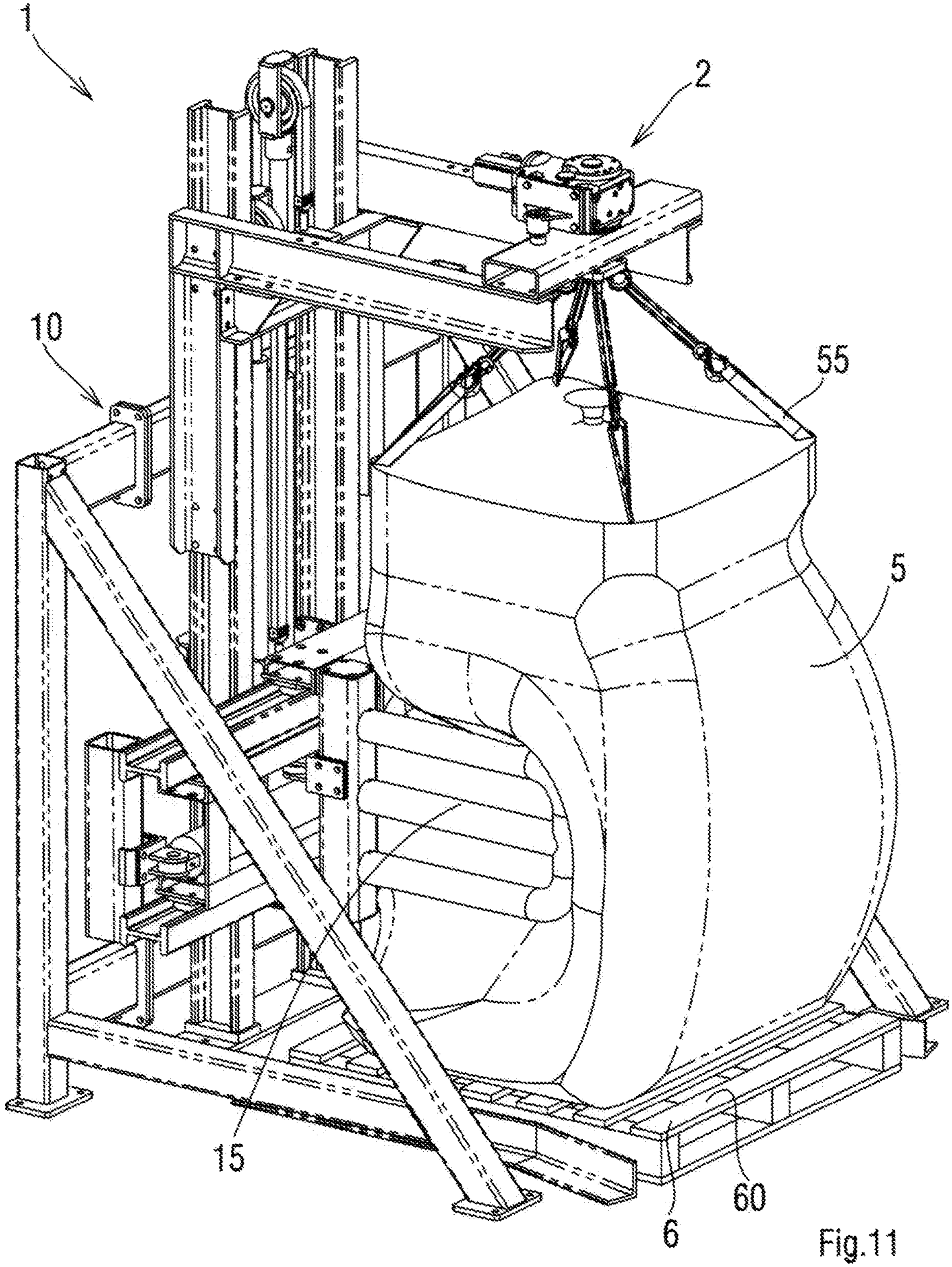
Figure 12:
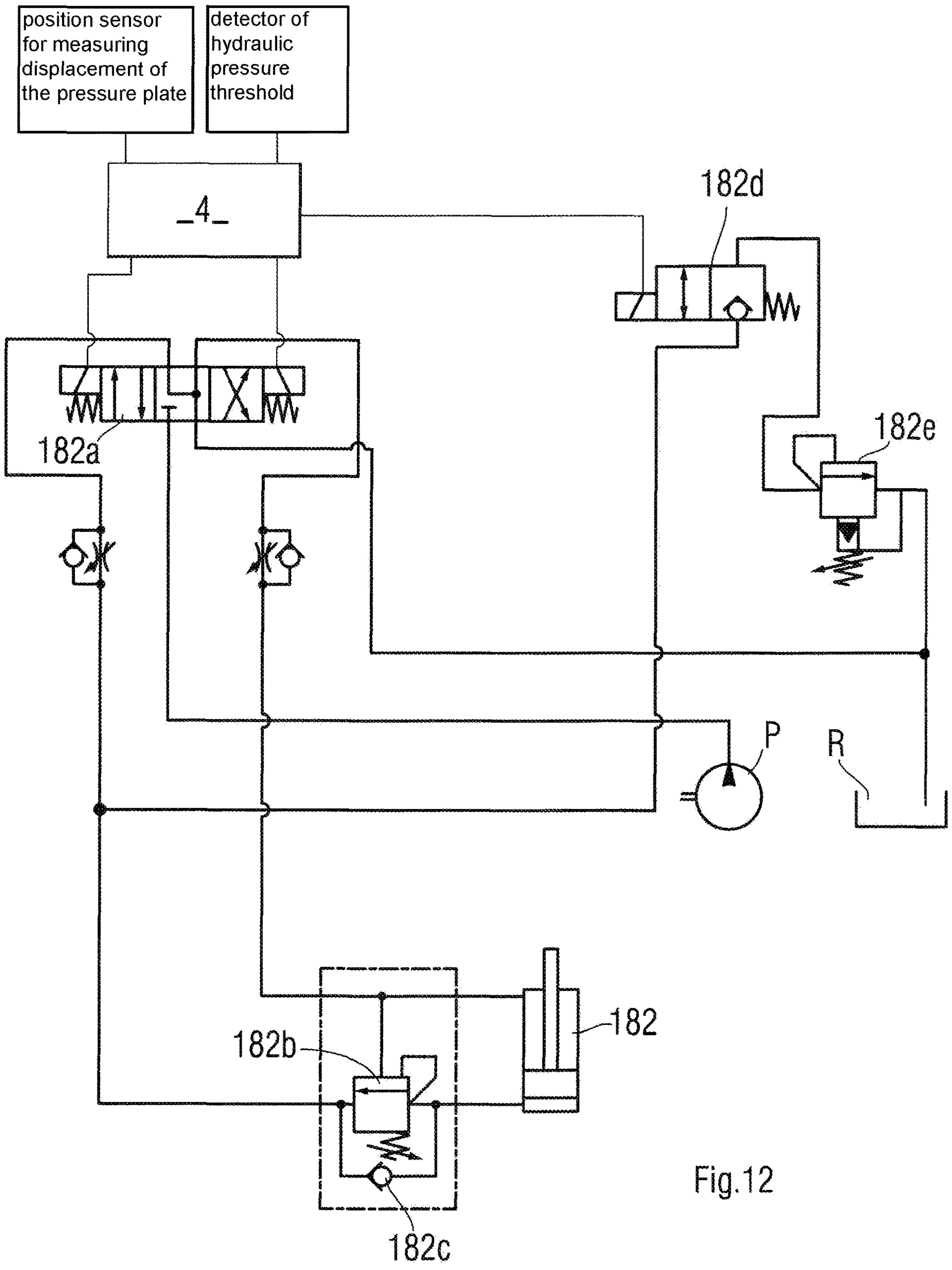
Figure 13:
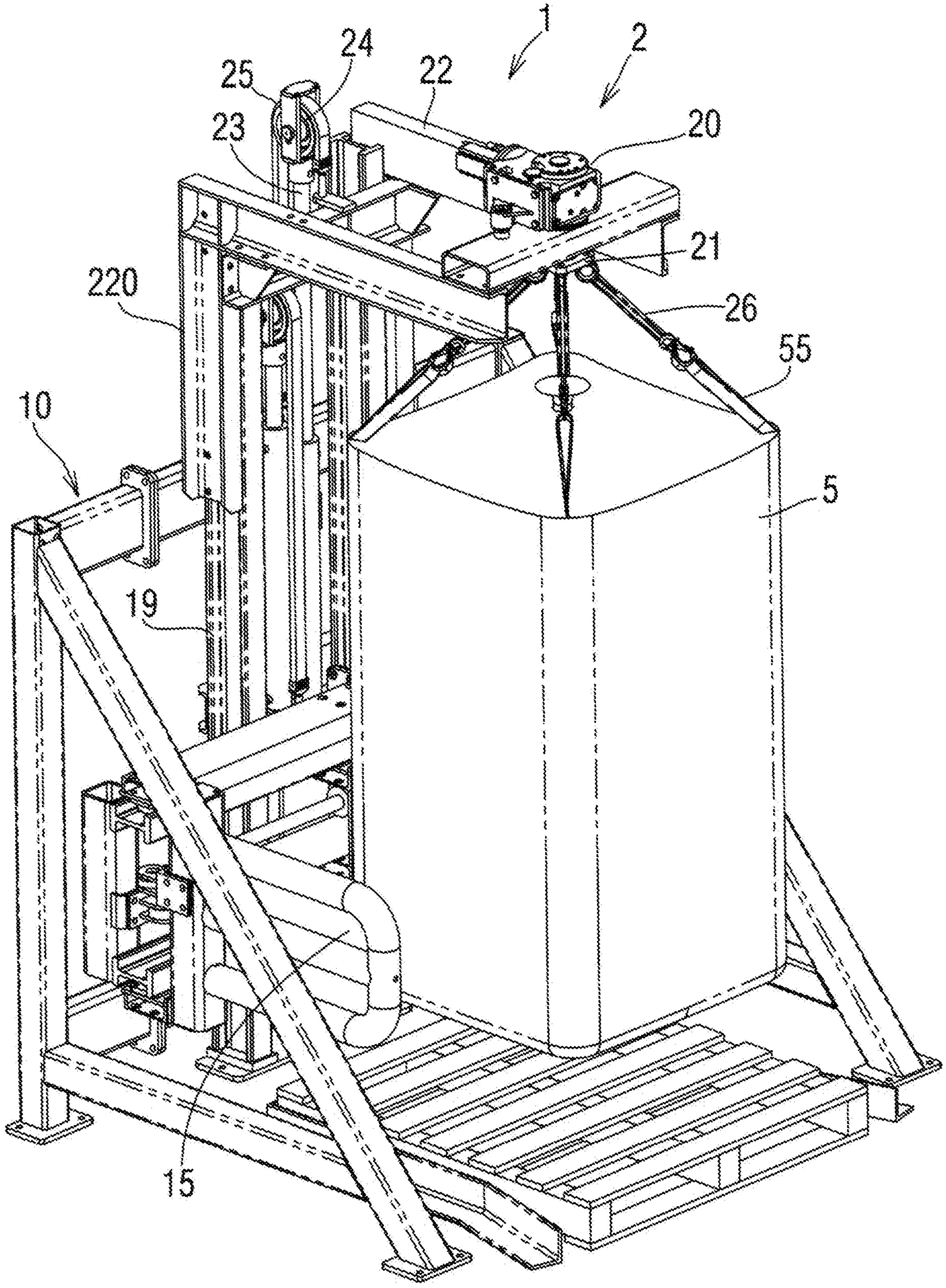
Figure 14:
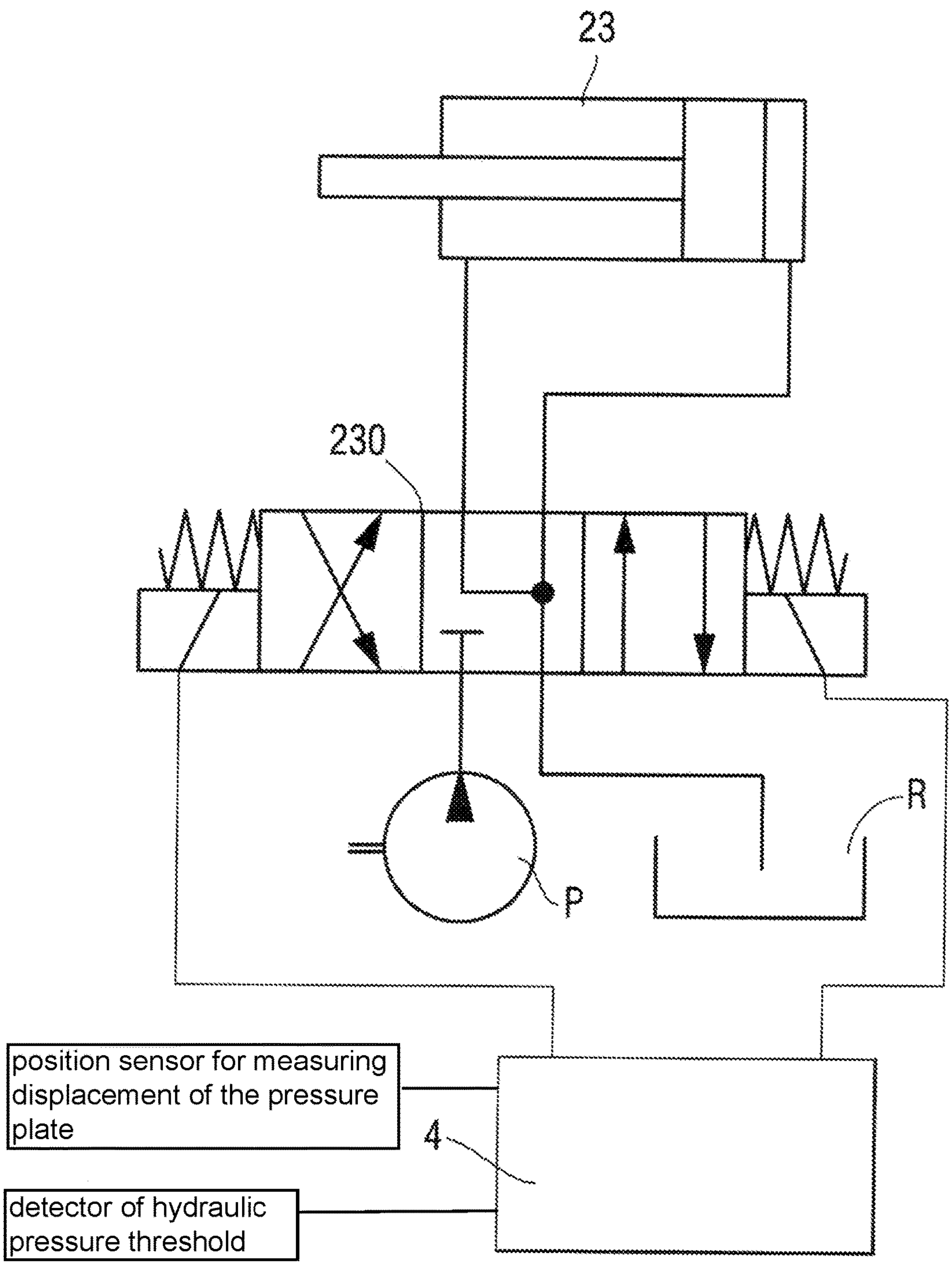
Figure 15:
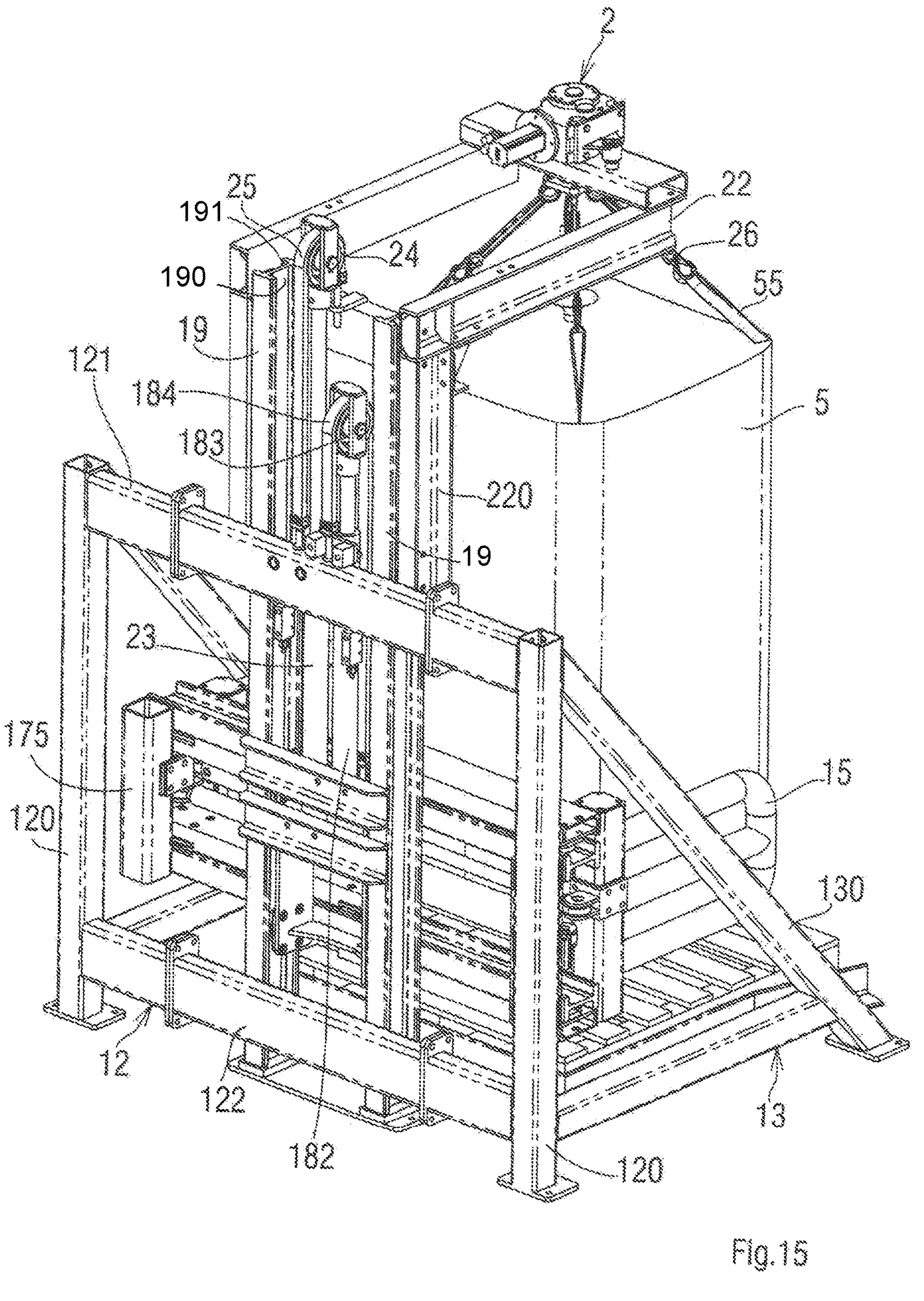

Further aims, advantages and characteristics of the invention will become apparent from the description of a preferred embodiment given by way of non-limiting example and made with reference to the accompanying drawings, in which:

FIG. 1 is a perspective view of a fragmentation unit in accordance with the invention, the bag and the openwork support for it not being shown in this figure, FIG. 2 is a perspective view of a fragmentation unit in accordance with the invention, equipped with a bag the contents of which are to be fragmented, FIG. 3 is a side view of a fragmentation unit in accordance with the invention, FIG. 4 is a top view of the fragmentation unit in accordance with the invention, FIG. 5 is a top view of the receiving region of the bag, FIG. 6 is a perspective view of the pressing assembly formed by the pressure plates, their actuating cylinder and their carriage and guide rails, FIG. 7 is a rear view of the pressing assembly, FIG. 8 is a sectional view along the line EE in FIG. 7, FIG. 9 is a view of the hydraulic diagram for the supply to the actuating cylinders of the pressure plates, FIG. 10 shows a perspective view of the fragmentation unit during an initialization phase, FIG. 11 shows a perspective view of the fragmentation unit in the situation in which the bag contents are being fragmented, FIG. 12 is a hydraulic diagram showing in particular the hydraulic overload means for the rear chamber of the cylinder for displacing the height of the pressure plates, FIG. 13 shows, as a perspective view, the fragmentation unit in the situation in which the bag is raised, FIG. 14 is a simplified hydraulic diagram showing the supply to the cylinder of the lifting assembly, FIG. 15 is a rear view, in perspective, of the fragmentation unit.

DESCRIPTION OF A PREFERRED EMBODIMENT OF THE INVENTION

The accompanying figures show a unit 1 in accordance with the invention for fragmenting a bagged solid mass, formed by a compacted powdered or granular material. This powdered or granular material is packaged in a flexible bulk bag 5 with a parallelepipedal shape, typically with a capacity in the range 1.5 $m^3$ to 2 $m^3$.

The bulk bag 5 comprises a base 50, four vertical lateral walls 51, in opposing pairs, vertically upright on the base 50 and an upper wall 52 provided with a flexible filling cuff 53. The base 50 of the bag is equipped with a flexible cuff for emptying materials, which is not shown. Finally, the bag 5 comprises four lifting straps 55.

The fragmentation unit 1 comprises a metal frame 10 including a vertical rear flank 12 and two lateral flanks 13 which are parallel and perpendicular to the rear flank 12. These rear and lateral flanks define an internal volume in which a receiving region 11 of the bag 5 extends, which is accessible via an access opening 14 formed in the front portion of the frame 10, this opening 14 extending from one lateral flank 13 to the other. The region 11, which is parallelepipedal in shape, is open towards the top and is at a distance from the rear and lateral flanks. This region is delimited by the ground and by four virtual planar vertical faces, namely a front face 11*a*, a rear face 11*b*, both being parallel to the rear flank 12 and at a distance from the latter, and two lateral faces 11*c*, both being parallel to the lateral flanks 13 of the frame and at a distance from said flanks 13. These virtual faces 11*a*, 11*b* and 11*c* are represented in FIG. 5 as heavy chain-dotted lines. It should be noted that the two normal distances between the two pairs of opposed walls 51 of the bag 5 are respectively close to the normal distances between the virtual faces 11*c* and between the virtual faces 11*a*, 11*b* of the receiving region 11.

The rear flank 12 of the frame 10 is formed by the assembly of two vertical uprights 120 with two crossbars, the upper 121 and the lower 122.

Each lateral flank 13 is fixed to one of the vertical uprights and is formed by a lower horizontal spar 130 and a load strut 131. As can be seen, this load strut 131 is fixed on the one hand to the corresponding upright 120 of the rear flank 12 and on the other hand to the lower spar 130. This load strut extends obliquely between said spar 130 and said upright 120.

The region 11 is divided into a front area 11*d* and into an rear area 11*e* of equal dimensions, by a vertical geometric plane AA' that is parallel to the rear flank 12 of the frame 10. The front area 11*d* is turned towards the front opening 14, while the rear area 11*e* is turned towards the rear flank 12. Thus, the two areas 11*d*, 11*e* have identical depths, this depth dimension being measured along a direction perpendicular to the rear flank 12. The region 11 at the ground level is preferably equipped with lateral 110 and rear 111 abutment means defining an area 112 for receiving and wedging an openwork support 6, which is horizontal, provided in order to receive and transport the bag 5.

The receiving and wedging area 112, which is preferably square in shape, extends centrally with respect to the region 11. Thus, this area 112 extends in a symmetrical manner with respect to the plane AA' as well as in a symmetrical manner with respect to a plane CC' perpendicular to the plane AA' and located equidistantly to the two lateral flanks 13 of the frame 10. It should be noted that the contour of the area 112 corresponds to the projection of the contour of the receiving region 11 on a horizontal plane, this projection following a square contour and the area 112 constituting the horizontal base of the region 11.

The lateral 110 and rear 111 abutment means are fixed to the ground using any known means, for example by anchor bolts.

In accordance with a practical embodiment, each abutment means 110, 111 is formed by a profile in the form of an angle iron comprising two wings that are perpendicular with respect to each other, namely a horizontal wing for support and for fastening to the ground and a vertical wing forming the abutment proper. The two lateral abutment means extend in a manner that is perpendicular to the rear flank 12, while the rear abutment means 111 is parallel to said flank 12. The horizontal wing of each abutment means is outside the receiving and wedging area 112. Advantageously, the front portions of the two lateral abutments 111 form a flare in order to facilitate introduction of the openwork support 6 into the receiving and wedging area 112.

The openwork support 6, with a square contour, is formed by horizontal slats 60 resting on an appropriate stand. The horizontal slats 60 are parallel and disposed at a constant separation from each other. The stand is formed by a series of cubes and by a lower plate bearing on the ground. Advantageously, this openwork support 6 is formed by the upper plate of a movable handling pallet 60, produced from wood, which is known per se, with standardized dimensions. The length of each side of the receiving area 112 is equal to or slightly higher by a few millimeters than the length of each horizontal side of the pallet 60 in a manner such that this pallet can be freely introduced into the receiving area 112 and be withdrawn from it.

It should be noted that the pallet 60 will be introduced into and removed from the receiving area 112 with the aid of a handling machine with forks of the forklift type, the use of which does not require a permit. Because of this, this machine can be handled by anybody, without any specific training.

In its internal volume, the fragmentation unit 1 receives a functional press assembly in particular comprising two pressure plates 15, which are metallic, opposed, vertical and perpendicular to the rear flank 12. These plates, of equal dimensions, are provided in order to be pressed against two opposed flanks of the bag 5 in order to fragment the contents. Preferably, they are at the same height with respect to the ground. These pressure plates 15 can be driven simultaneously one towards the other towards the region 11, and as a consequence towards the bag 5 if the latter is present in order to exert a pressure thereon. The plates can also be driven simultaneously to move them away from each other and from the region 11, and as a consequence from the bag 5, if this latter is present, to release the pressure and release said bag. Their height with respect to the ground can be adjusted so that the action of pressing and thus of fragmentation is carried out over the entire height of the bag 5.

Preferably, each pressure plate 15 has a planar pressing face 150 which is used to apply pressure against the bag 5, this planar face 150 being vertical, and perpendicular to the rear flank 12 of the frame. Preferably, this pressing face 150 has no discontinuities, i.e. no hollows or recesses.

Each pressure plate 15 comprises a front edge 151 facing the front opening 14, an upper horizontal edge 152, a lower horizontal edge 153 and a rear edge 154. The pressing face 150 has a rear edge 150*a* that is preferably rectilinear, and vertical, this rear edge 150*a* being opposite to the front edge of the pressure plate 15 and being located in front of the rear edge 154 of said plate.

In accordance with the invention, the rear edge 150*a* of the pressing face 150 of each pressure plate 15 is situated behind a geometric plane DD' containing the virtual rear face 11*b* and the length of each pressure plate 15 is such that the front edge 151 of said pressure plate is tangential to a vertical geometric plane BB' parallel to the plane AA' and dividing the front area 11*d* of the region 11 into two sub-areas, front and rear, of unequal or equal depths. Preferably, the depth of the rear sub-area, that included between the two planes AA' and BB', is smaller than the depth of the front sub-area, i.e. that located between said plane BB' and the virtual front face 11*a*. The term “depth” should be understood to mean the normal distance between the planes AA' and BB' as regards the rear sub-area and the normal distance between the plane BB' and the virtual front face 11*a* as regards the front sub-area.

Thus, the plane BB' is located behind and at a distance from the virtual face 11*a* and when the bag is correctly positioned in the receiving region 11, it is located behind and at a distance from the front face of said bag 5. Thus, each pressure plate 15 covers only a portion of the width of the bag 5 when this latter is in place in the receiving region 11, for example between 50% and 60% of said width, but it covers the normal distance between the plane BB' and the plane DD'. Preferably, the plane BB' is separated from the plane AA' by at most fifteen centimeters. Thus, during each pressing operation, the unpressed portion of the bag located immediately in front of the pressure plates 15 can easily receive the material expelled by the pressing action, making it free to deform.

After each pressing cycle of two opposed faces, the bag 5 is pivoted by a quarter turn in order to carry out pressing of the other two opposed faces. Thus, the bag executes one complete turn so that its four vertical faces are subjected to the action of the pressure plates 15 over their entire width. The fact that the pressure plates cover a little more than half of the width of each face of the bag means that during pressing, an overlapping effect is obtained.

Preferably, the front edge 151 of each pressure plate 15 is rounded at the level of its junction with the upper 152 and lower 153 horizontal edges in order to avoid the risk of damaging the bag during pressing. This characteristic is reinforced by the fact that the pressure plate 15 has rounded edges.

In accordance with a practical embodiment, each pressure plate 15 is formed by a framework 15*a* laterally covered by a vertical planar sheet 15*b* the planar face of which opposite to the framework 15*a* constituting the pressing face 150. This flat sheet is preferably solid, in that it is free from perforations. The framework 15*a* is advantageously formed by a frame produced from hollow tubular profiles with circular cross sections. Thus, this framework is formed by an upper horizontal profiled element with a circular cross section, constituting the upper edge of the plate 15, by a lower horizontal profiled element, with a circular cross section, constituting the lower edge of the plate 15, by a vertical rear profiled element constituting the rear edge of the plate and by a vertical profiled front element with a circular cross section, constituting the front edge of the pressure plate 15. It should be noted that the rear edge 154 of each pressure plate 15 is located in the proximity of the rear flank 12 so that it can be distanced from the bag 5 when the latter is correctly positioned in the receiving region 11.

Advantageously, the frame constituting the framework 15*a* of the plate comprises one or more long reinforcing spacers which counteract deformation of the flat sheet 15*b* during pressing of the bag.

Each pressure plate 15 is rigidly fixed via the vertical rear profile to a dedicated support carriage 16 mounted so as to be mobile in horizontal translation along two horizontal rails 17, which are parallel, fixed to a common lifting carriage mounted so as to be mobile in vertical translation over two vertical rails 19 fixed to the rear flank 12 of the frame 1. As can be seen, the support 16 and lifting 18 carriages as well as their guide rails 17 and 19 are integrated into the internal volume which defines the frame 10 of the fragmentation unit and at the back of the region 11 for receiving the bag 5. Thus, the bulk of the fragmentation unit has been reduced.

The support carriages 16 are actuated in horizontal translation along their rails 17, moving towards or away from each other, by means of motor means 163, 164 integrated into the volume included between the rear flank 12 and the region 11 for receiving a bag 5.

The two rails 17 are fixed to each other via two vertical end crossbars 175. Each rail 17 has two horizontal, opposed guide tracks 170, 171, wherein one cooperates with and guides the support carriage 16 of one of the pressure plates 15 and wherein the other cooperates with and guides with the support carriage 16 of the other pressure plate 15. Each guiding track 170, 171 comprises a horizontal base flank and two lateral flanks, perpendicular to the base flank.

Each carriage 16 is formed by two horizontal, parallel spars, upper 160 and lower 161, incorporating guide rollers 162 cooperating with the corresponding guide tracks 170 or 171. These spars 160, 161 are fixed to the vertical rear profile of the corresponding plate 15 by any known means.

In accordance with a practical embodiment, each motor means 163, 164 is constituted by a hydraulic cylinder. The two hydraulic cylinders 163, 164 are preferably horizontal and parallel to the rear flank 12 of the frame. These cylinders are mounted so as to oppose each other and are fixed by their bodies, for example via a joint, to the two end crossbars 175. Each cylinder is fixed to the carriage 16 which it actuates via its rod, for example via a joint. These two cylinders 163, 164 are mounted hydraulically in series in the sense that the rear chamber of the first cylinder 163 is connected by means of a line to the front chamber of the second cylinder 164. The value for the section of the rear chamber of the first cylinder 163 is equal to the value for the section of the front chamber of the second cylinder 164 reduced by the value for the section of the rod of this second cylinder, so that the useful sections of these two chambers are equal. The functional assembly formed by the two hydraulic cylinders 163, 164 is supplied via a hydraulic circuit which is known per se, in particular comprising a hydraulic distributer 165. This distributor 165 is electrically controlled by means of a monitoring and control unit 4 of known type. To this end, the two pilots of the distributor are electrically connected to the monitoring and control unit 4 by means of electrical connections, via an appropriate interface which is not shown. This distributor is, for example, of the four orifice, three position, four-way type.

FIG. 7 illustrates the hydraulic diagram for supplying this hydraulic assembly. For the purposes of simplification, not all of the hydraulic means are shown in this diagram. In particular, the flow limiters are not shown. It will be observed in this FIG. 7 that one of the outlet orifices of the distributor 165 is connected by means of a line to the rear chamber of the second cylinder 164, while the other outlet orifice is connected by means of a line to the front chamber of the first cylinder 163. It will also be observed that this distributor 165 is connected by one of its two inlet orifices to a hydraulic pump P and via its other inlet orifice to an oil reservoir R. Preferably, a means for measuring their displacements along their rails 17 is associated with the carriages 16.

A hydraulic pressure threshold detector associated with the supply circuit for the working chamber of one of the two cylinders 163, 164 is associated with the hydraulic supply circuit of the hydraulic assembly formed by the two cylinders 163, 164. As stated above, the working chamber is that which is supplied with fluid under pressure in order to displace the pressure plates 15 towards each other, and as a consequence to displace said plates 15 in the direction of pressing the bag 5.

In accordance with the practical embodiment, during pressing, the cylinders 163 and 164 function by pulling in this direction, while during the pressing operation, their front chamber is supplied with fluid under pressure via the pump P as regards the first cylinder 163 and via the rear chamber of this first cylinder 163 as regards the second cylinder 164.

The means for measuring the displacement and the pressure threshold detector are electrically connected to the monitoring and control unit 4 by means of electrical lines via appropriate interfaces.

In accordance with a practical embodiment, the means for measuring displacement is constituted by a cabled position sensor incorporating a winding drum of the cable and a sensitive element such as an encoder coupled to the drum and capable of delivering information representative of the degree of unwinding of the cable to the monitoring and control unit 4. Sensors of this type are known in the art and are routinely used.

The end of the cable could be fixed to one of the pressure plates 15, while the body of the sensor could be fixed to one of the rails 17.

The pressure threshold detector is capable of delivering a signal that is representative of a pressure value higher than the threshold value in the corresponding hydraulic circuit. Because of this threshold detector, prior to any fragmentation operations, it is possible to carry out an initialization phase in which a point of origin to the displacements of the pressure plates 15 in the sense of their moving towards each other is established. This initialization phase is clearly carried out after placing the bag 5 in the region 11 of the fragmentation unit, and consists of bringing the pressure plates 15 of said bag 5 towards each other until a resistance to their advancement, which is representative of contact of said plates 15 with said bag 5, is encountered (FIG. 10). This resistance to advancement gives rise to a sudden rise in the pressure in the hydraulic supply circuit for the corresponding working chamber and by transgressing the threshold value. A transgression signal is then emitted by the pressure threshold detector and is detected by the monitoring and control unit 4 which, starting from the distance datum supplied by the cabled sensor, can then establish a point of origin to displacements of the plates 15. The plates 15 can then be displaced towards each other from the point of origin over a limited pressing distance by a predetermined value, with a view to fragmenting the mass in the bag (FIG. 11). In this way, the risk of damage to the bag is avoided.

Preferably, with a view to carrying out the initialization phase, the plates 15 are disposed at the mid-height of the bag 5, this area normally being bulged the most. It should be noted that this initialization phase may also be used to determine the thickness of the hag, namely the distance between two opposed lateral walls 51 of said bag.

After the initialization phase and before the first pressing operation, the plates 15 are moved away from each other and brought to face the upper portion of the bag 5. Next, the fragmentation operation can begin. It consists of pressing each face of the bag by lowering the plates 15 by a predefined value after each pressing cycle, the value preferably being less than the height of each pressure plate 15 in order to obtain an overlapping effect.

Having regard to displacing the height of the functional pressing assembly constituted in particular by the plates 15, the carriages 16, the guide rails 17 and the motor means 163, 164, the lifting carriage 18, which is rigidly fixed to this pressing assembly, can be driven in translation along rails 19 by a motor assembly. Preferably, the lifting carriage 18 is fixed to the two guide rails 17 of the carriages 16 by any known means and is formed by two vertical uprights 180 carrying guide rollers 181. These guide rollers 181 cooperate with and guide the two rails 19. As can be seen, these two rails 19 each have at least one guide track 190 comprising a base flank and two lateral flanks that are perpendicular to the base flank. The guide rollers 181 of one of the uprights 180 of the carriage are engaged in the guide track 190 of one of the two rails 19; the rollers 181 of the other upright 180 are engaged in the guide track of the other guide rail 19. The guide rollers 181 of each upright 180 are constrained to roll on the base flank and on one of the two lateral flanks of the corresponding guide track 190.

The functional pressing assembly is associated with a means for measuring its height with respect to the ground, and thus of measuring its displacement. This measuring means, which is not shown, could be constituted by a cabled position sensor of the type described above. This sensor will be connected to the monitoring and control unit 4 by means of electrical connections and via an appropriate interface. This sensor integrates a cable winding drum and a sensitive element, such as an encoder, coupled to the drum. This sensor is capable of delivering to the monitoring and control unit 4 information representative of the degree of unwinding of the cable, and as a consequence of the height of the pressing assembly with respect to the ground. The cable end could, for example, be fixed to one of the rails 17 of the functional pressing assembly, while the body of the sensor could be fixed to one of the rails 19.

The motor assembly for driving the lifting carriage 18, and as a consequence the pressing assembly, in translation is preferably constituted by at least one hydraulic cylinder 182 and by a motion linkage deployed between the cylinder rod 182 and the lifting carriage 18. The body of the hydraulic cylinder 182 is preferably fixed via a joint to a horizontal crossbar fixed to the two rails 19, This cylinder 182 extends vertically against the rear flank 12 of the carriage and is oriented in a manner such that its rod occupies an upper position.

Preferably, the motion linkage is configured in the manner of a lifting pulley in order to multiply the amplitude of the movement of the rod of the cylinder 182. This linkage is formed on the one hand by a roller 183 rotatably mounted in a clevis fixed to the upper end of the rod of the cylinder 182 and on the other hand to a lift chain 184 wound partly around the roller 183 and fixed by one of its ends to the carriage 18 and by its other end to the upper crossbar 121 of the rear flank 12.

Deploying the rod of the cylinder 182 causes the lifting movement of the carriage 18 and as a consequence of the pressing assembly, the value for the displacement of this carriage 18 and of this pressing assembly then being double that of the value for the displacement of the rod of the cylinder 182. This disposition means that a cylinder with a reduced travel compared with the value for the displacement of the pressure plates 15 as regards height can be used.

FIG. 12 shows the hydraulic circuit associated with the hydraulic cylinder 182 in a schematic manner. As can be seen in this figure, the cylinder 182 is controlled by a piloted distributor 182*a* of the four orifice, three position, four-way type. The two pilots of this distributor are electrically connected by means of electrical connections via an appropriate interface, which is not shown, to the monitoring and control unit 4. Thus, this unit 4 is capable of controlling the distributor 182*a*, and as a consequence the movements of the rod of the cylinder 182. The distributor 182*a* is connected in known manner by means of an appropriate line to the hydraulic pump P and by means of another line to the hydraulic reservoir R.

A balancing valve formed by a pressure limiter 182*b* and a check valve 182*c* disposed in parallel are also associated with the hydraulic supply circuit for the cylinder 182 (FIG. 12). The check valve 182*c* can be used to supply the rear chamber of the cylinder directly and opposes emptying thereof, which can only operate by mediation of the pressure limiter 182*b*. As can be seen, this pressure limiter 182*b* is connected to the supply line for the front chamber of the cylinder 182. Thus, this pressure limiter is piloted by the pressure prevailing in the supply line for the front chamber of the cylinder and can only be activated beyond a predetermined pressure threshold in order to allow the oil contained in the rear chamber of the cylinder 182 to be evacuated. Thus, retraction of the rod of the cylinder 182 into the body of the cylinder, and as a consequence the downward movement of the pressing assembly, can only occur from a predetermined pressure threshold which is higher than the value for the hydraulic pressure which is generated solely by the weight of the pressing assembly in the front chamber of the cylinder 182. A configuration of this type enables the retraction movement of the rod into the body to be controlled and enables the downward movement of the pressing assembly to be controlled. As can be seen, the pressure limiter 182*b*, which includes the balancing valve, is provided with a pe relief drain. Thus, this balancing valve also constitutes a safety device.

During the pressing action, the pressure plates 15 are stressed upwards, which causes the lifting carriage 18 and the pressing assembly to be displaced upwards. It is then necessary to prevent the lift chain 184 from slackening and preventing the resulting slackness, i.e. the cause of the downward displacement of the pressing assembly under the effect of its own weight when the pressure plates 15 move away from each other. This unwanted displacement could result in damage to the bag by friction of the pressure plates against its walls. Thus, it is necessary to keep the lift chain 184 permanently under tension. For this reason, the hydraulic circuit supplying the cylinder 182 comprises hydraulic overload means the aim of which is to maintain a minimum pressure in the rear chamber of the cylinder 182 in order to keep the chain 184 under tension and to compensate for the weight of the pressing assembly and the carriage 18 without in any way displacing it along the rails 19.

Hydraulic overload means of this type are shown schematically in FIG. 12. These hydraulic overload means are formed by a piloted valve 182*d* and a pressure limiter 182*e*. The piloted valve 182*d* is of the normally closed type and of the two orifices, two positions, one-way type. This valve 182*d* is connected on the one hand upstream of the limiter 182*b* and of the valve 182*c* to the supply line for the rear chamber of the cylinder 182. On the other hand, the valve 182*d* is connected to the pressure limiter 182*e* which is itself connected to the hydraulic reservoir R via an appropriate return line. The pilot of the valve 182*d* is connected to the monitoring and control unit 4 via an electrical connection. Thus, the valve 182*d* is controlled by the monitoring and control unit 4. To carry out the overload function, the monitoring and control unit 4 actuates the distributor 182*a* in the direction of supplying the rear chamber of the cylinder 182 and simultaneously actuates the valve 182*d* in order to establish communication between the supply line for the rear chamber of the cylinder 182 and the pressure limiter 182*e*. By this means, the pressure in the rear chamber of the cylinder 182 is limited to that which is strictly necessary for displacement of the rod of the cylinder in order to tension the lift chain 184, all the time remaining well below the pressure value from which the action on the piston of the rod of the cylinder compensates for the weight of the pressing assembly and generates upwards displacement of said assembly.

Advantageously, the fragmentation unit 1 is also provided with a lifting assembly 2 provided to lift the bag and completely or partially disengage it from the openwork support 6 on which it rests. This lifting assembly 2 comprises a head 20 provided with a rotary spindle 21 disposed vertically to the receiving region 11 for the bag, centered with respect to the region, the vertical central geometric axis of said region and the geometric axis of rotation of the spindle 21 coinciding. Lanyards 26 for hooking up the straps 55 for transporting the bag 5 are attached to this spindle 21. Because of this disposition, the straps 55 of the bag 5 converge towards the center, i.e. towards the spindle 21, and because of this, cannot be placed under mechanical tension when pressing the upper portion of the bag. Raising the bag 5 during fragmentation operations participates in the disintegration of the mass it contains.

In accordance with a practical embodiment, the lifting assembly 2 comprises on the one hand a bracket 22 mounted so as to be movable in translation on second guide tracks 191 which include rails 19, and on the other hand, a motor assembly fixed to the rear flank 12 of the frame 10 and acting on the bracket 22 in order to displace its height. The head 20 is carried by the bracket 22 vertically over the receiving region 11 for the bag 5. The bracket 22 carries the head 20 vertically over the receiving region 11 for the bag 5. This bracket comprises two vertical uprights 220 equipped with guide rollers 221 provided in order to cooperate with and guide the guide tracks 191. This guide tracks 191 are formed so as to be opposite to the tracks 190 and each comprises a base flank and two lateral flanks perpendicular to the base flank. The guide rollers 221 of each upright 220 are constrained to roll on the base flank and on one of the lateral flanks of the corresponding guide track.

In accordance with a practical embodiment, the motor assembly provided for the displacement of the height of the bracket 22 is formed by a hydraulic cylinder 23 and by a motion linkage deployed between the bracket 22 and the rear flank 12 of the frame 10.

As can be seen in FIG. 14, the cylinder 23 is supplied via a hydraulic circuit which is known per se, in particular comprising a hydraulic distributor 230, of the four orifice, three position, four-way type, for example. The two pilots of the distributor are connected to a monitoring and control unit 4 by means of electrical connections via an appropriate interface, not shown. For the purposes of simplification, not all of the hydraulic means are shown in FIG. 14. In particular, the flow rate limiters are not shown. It will be observed in FIG. 14 that one of the outlet orifices of the distributor 230 is connected to the rear chamber of the cylinder 23 by means of a line, while the other outlet orifice is connected to the front chamber of this cylinder 23 by means of a line. It will also be observed that this distributor 230 is connected to the hydraulic pump P by one of its two inlet orifices and to the oil reservoir R by means of its other inlet orifice.

Preferably, the linkage of movement is configured in the manner of a lifting pulley in order to multiply the amplitude of the movement of the rod of the cylinder 23. In accordance with a practical embodiment, the cylinder 23 is disposed vertically, with the rod in the upper portion, and the upper end of this latter carries a clevis in which a pulley 24 is rotatably mounted around which a lift chain 25 is partly wound. This chain is fixed by one of its two ends to the bracket 22 and by its other end to the upper crossbar 21 of the rear flank 12. The chain 25 and the roller 24 constitute the aforementioned linkage.

The head 20 of the lifting assembly incorporates a motor means constituted by a servomotor. This servomotor is connected to the monitoring and control unit 4 by means of electrical connections so that it can be controlled thereby. This servomotor is capable of actuating rotation about a vertical axis of the spindle 21 of the head 20. It will be understood that by raising the bag, by displacing the lifting assembly and by rotating the spindle 21 by a quarter turn, two fresh opposed faces of the bag 5 will be brought to face the pressure plates 15.

It is also possible to actuate the spindle 21 in rotation about a quarter turn before lifting the bag 5 in order to twist the straps 55 and the lanyards 26. Because of this disposition, during its lifting movement, the bag will be driven in rotation, no longer by the spindle 21, but by the untwisting action of the straps 55 and the lanyards 26. Advantageously, rotation of the bag 5 will be slowed by friction of the base 50 against the openwork support 6. During this slowing action, the abutment means 110 and 111 effectively oppose rotation of the openwork support 6.

A means for measuring its height with respect to the ground is associated with this lifting assembly. This measuring means, which is not shown, could preferably be constituted by a cabled position sensor of the type described above. This position sensor is connected to the monitoring and control unit 4 by means of electrical connections, via an appropriate interface. The end of the cable could be fixed to the bracket 22, while the body of this sensor could be fixed to one of the rails 19. By this means, it becomes possible to control the degree of lifting of the bracket 22 in order to allow either the base 50 of the bag to be moved completely away from the openwork support 6, or to raise the bag 5 slightly so that the base 50 can remain bearing lightly against the openwork support 6 and can rub against the latter during rotation of the bag.

In accordance with a practical embodiment, the guide rollers 162, 181 and 221 are combined rollers. These rollers are each formed by a roller body in the form of a solid of revolution receiving a rotatable outer ring constituting a tread. The axis of rotation of this ring and the axis of revolution of the roller body coincide. By means of this outer ring, the roller is caused to roll on one of the lateral flanks of the corresponding guide track. The roller also comprises a second tread rotatably mounted on an axis fixed to the roller body. The geometric axis of rotation of this second tread is perpendicular to the axis of rotation of the outer ring. This second tread is provided for rolling on the base flank of the corresponding guide track. Combined rollers of this type, as described briefly here, are known in the art and are in routine use.

While the fragmentation unit that has been described is provided in order to carry out fragmentation operations before emptying the bag, clearly it could be used during emptying thereof in order to facilitate this operation by making suitable adaptations that are within the purview of the person skilled in the art.

Similarly, a fragmentation unit equipped with a pressing assembly comprising two opposed pressure plates 15 has been described above, but clearly, the pressing assembly could comprise several pairs of pressure plates 15.

Clearly, any arrangements and variations could be applied to the present invention in respect of technical equivalents without in any way departing from the scope of the present patent as defined in the appended claims.

The invention claimed is:

1. A fragmentation unit (1) for a bagged solid mass, comprising:

a frame (10) including a vertical rear flank (12) and two lateral flanks (13) that are parallel and perpendicular to the rear flank (12), said flanks (12, 13) defining an internal volume in which a region (11) extends for receiving a bag (5) with a parallelepipedal shape with contents of which are to be fragmented, said bag (5) being provided in order to rest on an openwork support (6) installed in said region (11), the region being accessible via an opening (14) formed in a front portion of the frame (10), said region (11), which is parallelepipedal in shape, being open towards a top, being separated from the rear (12) and lateral (13) flanks and being delimited by the ground and by four virtual planar vertical faces, namely a front face (11*a*), a rear face (11*b*), both being parallel to the rear flank (12) of the frame, and two lateral faces (11*c*), said region being divided into a front area (11*d*) and into a rear area (11*e*) of equal dimensions by a vertical geometric plane (AA') parallel to the rear flank (12) of the frame (10), a pressing assembly comprising at least two vertical pressure plates (15), which are opposed, parallel to the lateral flanks (13) of the frame and mounted in the internal volume that defines the frame, each plate (15) having a height, a length defined in accordance with a direction perpendicular to the rear flank and extending between a first rear edge (154) and a front edge (151) opposite to said first rear edge, said front edge (151) facing the front opening (14), each pressure plate (15) having a vertical planar pressing face (150) having a second rear edge (150*a*) opposite to the front edge (151) of the pressure plate and said pressure plates (15) being movably mounted so as to move towards or away from each other and in a manner which is movable in respect of height, wherein the second rear edge (150*a*) of the pressing face (150) of each pressure plate (15) is situated behind a geometric plane (DD') containing the virtual planar rear face (11*b*), wherein the front edge (151) of each pressure plate (15) is tangential to a vertical geometric plane (BB') parallel to the plane (AA') and dividing the front area (11*d*) of the region (11) into two sub-areas, namely a rear sub-area comprised between the planes (AA') and (BB') and a front sub-area comprised between the plane (BB') and the virtual front face (11*a*) of the region (11), wherein the fragmentation unit (1) comprises a lifting assembly (2) provided to raise the bag and release the bag from the openwork support (6) on which the bag rests, said lifting assembly comprising a head (20) provided with a rotary spindle (21) to which transport straps (55) of the bag (5) are attached with interposed lanyards (26), said spindle (21) being actuatable in rotation by a motor means in order to cause the bag (5) to pivot by a quarter of a turn, said transport straps converging towards a center that is towards the spindle (21), and wherein the lifting assembly (2) comprising the head (20) provided with the rotary spindle (21) is disposed vertically to a receiving region (11) for the bag, centered with respect to the receiving region, a vertical central geometric axis of said receiving region and a geometric axis of rotation of the spindle (21) coinciding.

2. The fragmentation unit (1) as claimed in claim 1, wherein a depth of the rear sub-area is less than a depth of the front sub-area.

3. The fragmentation unit as claimed in claim 2, wherein the plane (BB') is at a distance of at most fifteen centimeters from the plane (AA').

4. The fragmentation unit (1) as claimed in claim 1, wherein each pressure plate (15) is rigidly fixed to a dedicated support carriage (16) that is movably mounted in translation on horizontal rails (17), the horizontal rails (17) fixed to a common lifting carriage (18) that is movably mounted in vertical translation on two vertical rails (19) fixed to the rear flank (12) of the frame (10), said support carriages (16) being actuatable in translation along the horizontal rails (17), moving towards or away from each other, by means of motor means (163, 164).

5. The fragmentation unit (1) as claimed in claim 4, wherein:

each motor means (163, 164) is formed by a hydraulic cylinder, the two hydraulic cylinders (163, 164) are hydraulically mounted in series, a rear chamber of the first cylinder (163) being hydraulically connected by means of a line to a front chamber of the second cylinder (164), a value for a section of the rear chamber of the first cylinder (163) is equal to a value for a section of the front chamber of the second cylinder (164) reduced by a value for the section of a rod of said second cylinder.

6. The fragmentation unit (1) as claimed in claim 5, further comprising a position sensor for measuring a displacement of the pressure plates (15) along the horizontal rails (17), and with a detector of a hydraulic pressure threshold associated with a supply circuit for a working chamber of one of the two cylinders (163, 164), said position sensor and said detector being connected to a monitoring and control unit (4) and said detector being capable of delivering a threshold transgression signal when a pre-established value for the hydraulic pressure threshold is transgressed, the monitoring and control unit (4), starting from receipt of said signal, ensuring a generation of a point of origin for the displacements of the pressure plates (15) during an initialization phase in which the pressure plates (5) are pressed against the bag, these pressure plates being displaced towards each other during each bag pressing operation from the point of origin by a constant, pre-established value.

7. The fragmentation unit (1) as claimed in claim 4, wherein the lifting carriage (18) is actuated in translation along the two vertical rails (19) by a motor assembly formed by a vertical cylinder (182) and a motion linkage deployed between a rod of the cylinder and the lifting carriage (18), said linkage being configured in the manner of a lifting pulley in order to multiply an amplitude of movement of the rod of the cylinder (182), the cylinder being oriented in a manner such that the rod occupies an upper position and the motion linkage being formed both by a roller (183) mounted in rotation in a clevis fixed to an upper end of the rod of the cylinder (182), as well as by a lift chain (184) wound partly around a roller (183) and fixed by one end to the lifting carriage (18) and another end to the rear flank (12).

8. The fragmentation unit (1) as claimed in claim 7, wherein a hydraulic circuit supplying the cylinder (182) comprises hydraulic overload means.

9. The fragmentation unit (1) as claimed in claim 1, wherein the lifting assembly is formed both by a bracket (22) mounted in a manner which is movable in translation on guide tracks (191) that comprise vertical guide rails (19) and also by a motor assembly fixed to the rear flank (12) of the frame (10) and acting on the bracket (22) in order to displace the height thereof, said motor assembly being formed by a hydraulic cylinder (23) and a motion linkage deployed between the bracket (22) and the rear flank (12) of the frame (10), said hydraulic cylinder being oriented in a manner such that a rod of the hydraulic cylinder occupies an upper position and said motion linkage being configured in the manner of a lifting pulley in order to multiply an amplitude of movement of the rod of the cylinder (23) and being formed by a roller (24) mounted in rotation in a clevis carried by the rod of the cylinder (23) and by a lift chain (25) wound partly around the roller (24) and fixed by one end to the bracket (22) and by another end to the rear flank (12) of the frame (10).

10. The fragmentation unit (1) as claimed in claim 1, wherein the region (11) at the ground level is equipped with lateral (110) and rear (111) abutment means defining an area (112) for receiving and wedging the openwork support (6).

11. The fragmentation unit (1) as claimed in claim 2, wherein each pressure plate (15) is rigidly fixed to a dedicated support carriage (16) that is movably mounted in translation on horizontal rails (17), the horizontal rails (17) fixed to a common lifting carriage (18) that is movably mounted in vertical translation on two vertical rails (19) fixed to the rear flank (12) of the frame (10), said support carriages (16) being actuatable in translation along the horizontal rails (17), moving towards or away from each other, by means of motor means (163, 164).

12. The fragmentation unit (1) as claimed in claim 3, wherein each pressure plate (15) is rigidly fixed to a dedicated support carriage (16) that is movably mounted in translation on horizontal rails (17), the horizontal rails (17) fixed to a common lifting carriage (18) that is movably mounted in vertical translation on two vertical rails (19) fixed to the rear flank (12) of the frame (10), said support carriages (16) being actuatable in translation along the horizontal rails (17), moving towards or away from each other, by means of motor means (163, 164).

13. A fragmentation method comprising:

employing a fragmentation unit comprising:

a frame (10) including a vertical rear flank (12) and two lateral flanks (13) that are parallel and perpendicular to the rear flank (12), said flanks (12, 13) defining an internal volume in which a region (11) extends for receiving a bag (5) with a parallelepipedal shape with contents of which are to be fragmented, said bag (5) being provided in order to rest on an openwork support (6) installed in said region (11), the region being accessible via an opening (14) formed in a front portion of the frame (10), said region (11), which is parallelepipedal in shape, being open towards a top, being separated from the rear (12) and lateral (13) flanks and being delimited by the ground and by four virtual planar vertical faces, namely a front face (11*a*), a rear face (11*b*), both being parallel to the rear flank (12) of the frame, and two lateral faces (11*c*), said region being divided into a front area (11*d*) and into a rear area (11*e*) of equal dimensions by a vertical geometric plane (AA') parallel to the rear flank (12) of the frame (10), a pressing assembly comprising at least two vertical pressure plates (15), which are opposed, parallel to the lateral flanks (13) of the frame and mounted in the internal volume that defines the frame, each plate (15) having a height, a length defined in accordance with a direction perpendicular to the rear flank and extending between a first rear edge (154) and a front edge (151) opposite to said first rear edge, said front edge (151) facing the front opening (14), each pressure plate (15) having a vertical planar pressing face (150) having a second rear edge (150*a*) opposite to the front edge (151) of the pressure plate and said pressure plates (15) being movably mounted so as to move towards or away from each other and in a manner which is movable in respect of height, wherein the second rear edge (150*a*) of the pressing face (150) of each pressure plate (15) is situated behind a geometric plane (DD') containing the virtual planar rear face (11*b*), wherein the front edge (151) of each pressure plate (15) is tangential to a vertical geometric plane (BB') parallel to the plane (AA') and dividing the front area (11*d*) of the region (11) into two sub-areas, namely a rear sub-area comprised between the planes (AA') and (BB') and a front sub-area comprised between the plane (BB') and the virtual front face (11*a*) of the region (11), wherein the fragmentation unit (1) comprises a lifting assembly (2) provided to raise the bag and release the bag from the openwork support (6) on which the bag rests, said lifting assembly comprising a head (20) provided with a rotary spindle (21) to which transport straps (55) of the bag (5) are attached with interposed lanyards (26), said spindle (21) being actuatable in rotation by a motor means, in order to cause the bag (5) to pivot by a quarter of a turn, said transport straps converging towards a center that is towards the spindle (21), and wherein the lifting assembly (2) comprising the head (20) provided with the rotary spindle (21) is disposed vertically to a receiving region (11) for the bag, centered with respect to the receiving region, a vertical central geometric axis of said receiving region and a geometric axis of rotation of the spindle (21) coinciding, the method further comprising:

I) placing the pressure plates (15) at the mid-height of the bag and bringing them towards each other until they make contact with the bag (5) and establish a point of origin for displacements of the pressure plates (15) towards each other, II) bringing the pressure plates (15) to an upper part of the bag (5) with a view to starting a fragmentation cycle, III) starting a fragmentation cycle by pressing the bag (5), IV) after the cycle of fragmentation by pressing, lowering the pressure plates (15) towards a bottom by a predefined displacement step, V) repeating steps III and IV until a lower area of the bag is reached.

14. The method as claimed in claim 13, wherein each fragmentation cycle consists of:

a) applying the pressure plates (15) against the bag (5) and displacing them one towards the other by a predetermined distance, measured from the point of origin, in order to fragment the contents of the bag, b) releasing pressure, c) moving the pressure plates (15) away from each other, d) raising the bag (5), e) pivoting the bag (5) by a quarter of a turn, f) replacing the bag (5) on the bag's openwork support (6), g) repeating steps a) to f) for each lateral face of the bag.

15. The fragmentation method as claimed in claim 14, wherein immediately before each fragmentation cycle, the method includes bringing the pressure plates (15) to the upper part of the bag (5) and of repeating the preceding fragmentation cycles.

16. The fragmentation method as claimed in claim 14, further comprising slowing movement of the bag (5) during rotation of the bag.

17. The fragmentation method as claimed in claim 16, wherein the slowing of the rotational movement of the bag (5) is operated by means of friction of said bag (5) on the openwork support (6).

18. The fragmentation method as claimed in claim 14, further comprising angularly displacing the spindle (21) of the head (20) by a quarter of a turn before raising the bag.

19. The fragmentation method as claimed in claim 13, wherein a value for the displacement step of the pressure plates (15) towards the bottom is less than the height of each pressure plate (15).

* * * * *